(12) United States Patent
Scholz et al.

(10) Patent No.: US 8,252,173 B2
(45) Date of Patent: Aug. 28, 2012

(54) WATER FILTER CARTRIDGE SYSTEM HAVING A COMBINED BLENDING VALVE SYSTEM IN THE CANDLE AND ADJUSTING DEVICE IN THE HEAD

(75) Inventors: Roland Scholz, Haan (DE); Andreas Wawrla, Widnau (CH)

(73) Assignee: Aquis Wasser-Luft-Systeme GmbH, Lindau Zweigniederlassung Rebstein, Rebstein (CH)

( * ) Notice: Subject to any disclaimer, the term of this patent is extended or adjusted under 35 U.S.C. 154(b) by 766 days.

(21) Appl. No.: 12/226,005

(22) PCT Filed: Apr. 5, 2007

(86) PCT No.: PCT/EP2007/003103
§ 371 (c)(1),
(2), (4) Date: Nov. 26, 2008

(87) PCT Pub. No.: WO2007/115793
PCT Pub. Date: Oct. 18, 2007

(65) Prior Publication Data
US 2009/0173675 A1    Jul. 9, 2009

(30) Foreign Application Priority Data

Apr. 5, 2006 (DE) .......................... 10 2006 016 357
Sep. 20, 2006 (DE) .......................... 10 2006 044 746
Feb. 28, 2007 (DE) .......................... 10 2007 010 129

(51) Int. Cl.
*B01D 35/147* (2006.01)
(52) U.S. Cl. ..................... 210/130; 210/420; 210/433.1; 210/434; 210/443; 210/456

(58) Field of Classification Search ................... 210/232, 210/130, 132, 418, 420, 433.1, 440, 443, 210/444, 456
See application file for complete search history.

(56) References Cited

U.S. PATENT DOCUMENTS

| | | | |
|---|---|---|---|
| 3,334,754 A * | 8/1967 | Kudlaty | 210/444 |
| 5,174,337 A | 12/1992 | Dahlen et al. | |
| 5,336,406 A | 8/1994 | Stanford et al. | |
| 5,486,288 A * | 1/1996 | Stanford et al. | 210/235 |
| 5,705,067 A * | 1/1998 | Sumi et al. | 210/234 |
| 5,826,854 A * | 10/1998 | Janvrin et al. | 251/149.9 |
| 5,855,777 A | 1/1999 | Bachand et al. | |
| 6,800,200 B2 * | 10/2004 | Bassett et al. | 210/315 |
| 6,923,910 B2 | 8/2005 | McGibbon | |
| 6,949,189 B2 | 9/2005 | Bassett et al. | |
| 7,517,449 B2 * | 4/2009 | Choi et al. | 210/136 |
| 7,837,876 B2 * | 11/2010 | Ye et al. | 210/234 |

(Continued)

FOREIGN PATENT DOCUMENTS

DE    37 80 990 T2    1/1993
(Continued)

*Primary Examiner* — Joseph Drodge
(74) *Attorney, Agent, or Firm* — Breneman & Georges

(57) ABSTRACT

The present invention relates to a water filter, having a filter head and an interchangeable filter cartridge, with a blend-adjusting element which is located on the filter cartridge. The water filter is distinguished in that during the operation of installing the interchangeable filter cartridge in the filter head, the blend-adjusting element is positioned together with the filter cartridge on the filter head via adjustable or fixed drivers. In a further embodiment, the water filter is distinguished in that an adjusting device comprises an untreated-water distribution element arranged in or on the filter head and a partial-flow channel guiding element which is complementary with respect thereto and is arranged in or on the filter cartridge.

28 Claims, 21 Drawing Sheets

U.S. PATENT DOCUMENTS

2001/0009237 A1  7/2001  Chau

FOREIGN PATENT DOCUMENTS

Figure 1:
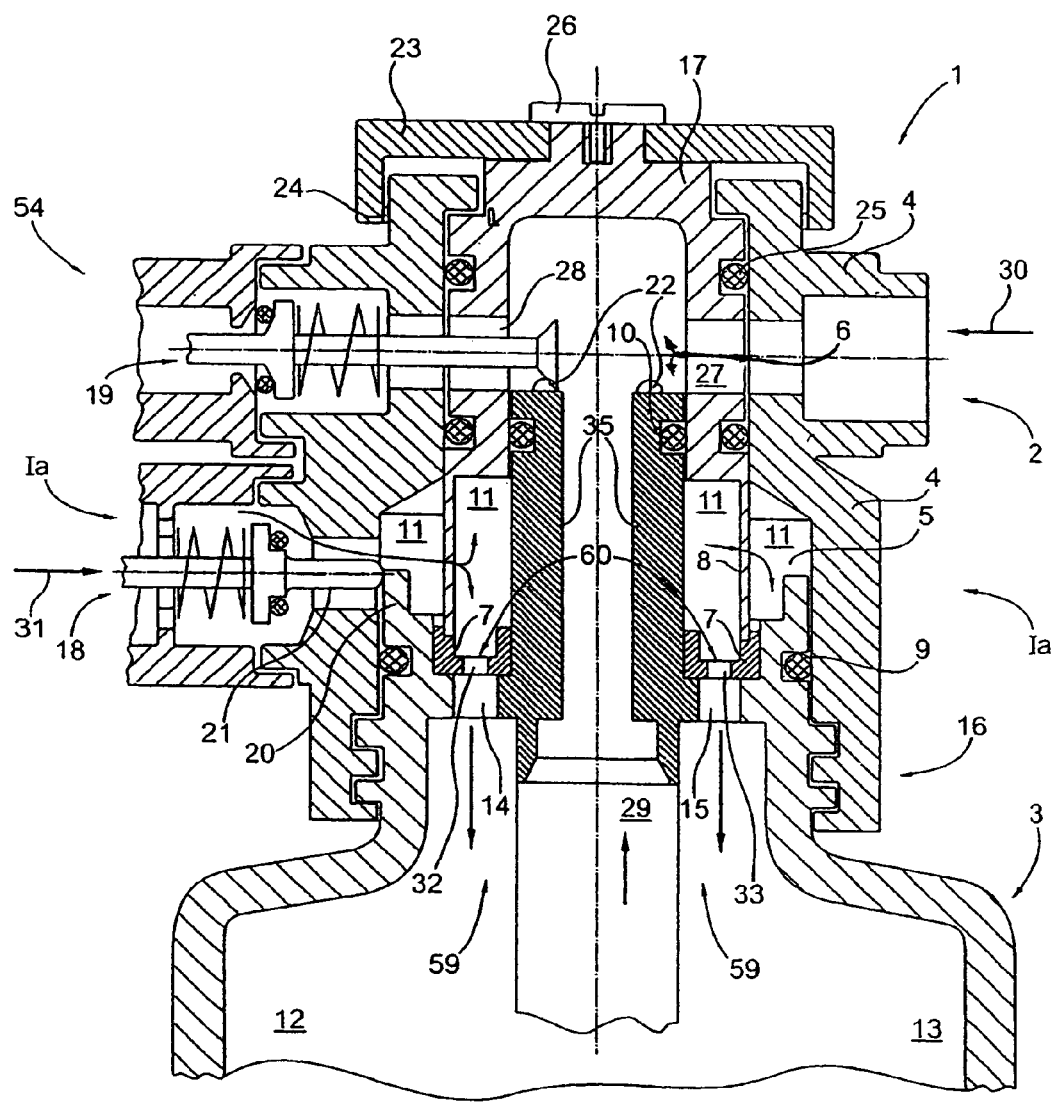

| | | |
|---|---|---|
| DE | G 92 07 977.6 | 1/1993 |
| DE | 37 89 714 T2 | 8/1994 |
| DE | 44 22 709 A1 | 1/1996 |
| DE | 196 48 405 A1 | 10/1998 |
| DE | 199 58 648 A1 | 6/2001 |
| DE | 696 22 719 T2 | 4/2003 |
| DE | 10 2004 049 876 A1 | 4/2006 |
| DE | 10 2004 049 877 A1 | 4/2006 |
| EP | 0 844 339 A2 | 11/1997 |
| JP | 9-174050 | 7/1997 |
| WO | WO 99/01220 | 1/1999 |
| WO | WO 01/80967 A1 | 11/2001 |
| WO | WO 2004/007374 | 1/2004 |
| WO | WO 2007/115793 A1 | 10/2007 |

* cited by examiner

WATER FILTER CARTRIDGE SYSTEM HAVING A COMBINED BLENDING VALVE SYSTEM IN THE CANDLE AND ADJUSTING DEVICE IN THE HEAD

BACKGROUND OF THE INVENTION (1) Field of the Invention

The present invention relates to a water filter having a filter head and an interchangeable filter cartridge with an untreated-water distribution element which is located on the filter cartridge as well as a filter head and an interchangeable filter cartridge with a blending device and an adjusting device for adjusting a partial-flow ratio between at least two flow paths in which at least one flow path is a filter section.

(2) Description of Related Art Including Information Disclosed Under 37 CFR 1.97 and 1.98

In order to set a predetermined water quality for the particular use, softening/decarbonizing/demineralizing systems based on interchangeable filter candles contain a blending device for coordinated mixing of water treated via the filter section with water which has not been filtered or has been conducted over a different water treatment medium.

These systems are used in the treatment of drinking water in private households and in the catering trade as a central or decentral installation for the supply of extraction points and especially for the supply of modern kitchen appliances, for example coffee machines, taps and ice-makers (for example in modern refrigerators), and furthermore in the commercial sector for the supply of drinks vending machines for the preparation of cold and hot drinks, of dishwashers and steam cookers for the purpose of optimizing the taste of the drinks and meals prepared or produced therewith, and in order to protect the machines from technical problems caused by water.

According to the prior art, there are simple solutions for this with fixed holes in the cartridge head. In these solutions, the blending water remains unfiltered and adaptation of the filter cartridge to specific requirements is not possible.

A further known embodiment option is the integration of an adjustable blending device in the head. Although the blending can be adapted individually here, the blending water cannot be filtered—for example over activated carbon, since it is guided past the filter cartridge.

Constructions with a blending device in the filter head are also already in existence, said constructions providing separate guidance of the main water flow and blending water flow to the filter cartridge, with the blending water additionally being guided via other treatment media in the cartridge. A disadvantage of this construction is the considerable complexity in the filter head because of the blending valve and the separation of three volumetric flows: a) for the treatment section, b) for the blending water section, and c) for the return of the entire filtrate. These concepts are described, for example, in DE 199 58 648 A1 and WO2004/007374 A1.

A further option is to integrate the blending valve in the cartridge. In this connection, constructions are known which permit filtration of the blending water and those which do not permit filtration of the blending water. A concept without filtration of the blending water is described, for example, in U.S. Pat. No. 6,923,910 B2. In these embodiments, the head constructions are simple, since they do not contain a blending valve and only two volumetric flows have to be guided.

Furthermore, constructions are also known which permit adjustment of the quantity of blending water in the filter cartridge. A disadvantage of the blending system which is integrated in the cartridge is the necessity, upon each change of cartridge, of having to reset the blend ratio at the filter cartridge in order to adapt the water quality again to the application. Upon a change of cartridge, errors are frequently made when adjusting the blending quantity, or the adjustment is even completely forgotten, thus giving rise to undesirable effects, such as furring up of the machines and quality problems with the prepared foodstuffs.

BRIEF SUMMARY OF THE INVENTION

The present invention addresses the problem of improving a water filter according to the type heretofore described in the Field Of The Invention.

This problem of improving a water filter is solved by adjustable fixed drivers on the filter head that operate the untreated-water distribution element of the filter cartridge during the installation of the interchangeable filter cartridge in the filter head and also having a filter head with an untreated-water distribution element with a blending device and an adjusting device for adjusting a partial-flow ratio between at least two flow paths wherein at least one flow path is a filter section and a partial-flow channel guiding element which is complementary with respect thereto and is arranged on the filter cartridge. Further advantages and expedient embodiments may include arranging the untreated-water distribution element in or on the filter head, having a lockable partial flow guiding element lockable in relation to the filter head, having the untreated-water distribution element with a partial-flow channel guiding element disposed in the interior of the filter head, having the untreated-water distribution element adjustable radially in relation to the partial-flow channel guiding element, having the untreated-water distribution element adjustable axially in relation to the partial-flow guiding element, having the untreated water distribution element included as part of the filter head, having the untreated-water distribution element designed as an element that can be inserted into the filter head, providing an unreleasable connection between the untreated-water distribution element and the filter head, providing a releasable connection between the untreated-water distribution element and the filter head, designing the untreated-water distribution element as an interchangeable element, providing a control element for the untreated-water distribution element, providing a positioning unit for the untreated-water distribution element in the filter head, providing a lockable positioning unit, having an untreated-water distribution element with at least one passage element and/or a cover element, having the untreated-water distribution element in the form of a ring or disk, having the untreated-water distribution element in the form of a sleeve, having at least one filter section inlet and at least one blending section inlet or filter section inlet or water treatment section inlet in the partial-flow guiding element, having a plurality of openings in the filter section inlet and/or blending section inlet or filter section inlet or water selection inlet, having inlet openings of a slot-shaped design, having inlet openings of a predominately circular to oval design, providing the partial-flow guiding element with a channel structure that connects at least parts of the respective passages for the filter section and/or parts of the passages for the blending section to one another, designing the structure of the channels such that when the filter cartridge is inserted into the filter head, the channels are arranged opposite the inlets for two treatment sections, having the structure of the channels connect to one another in a liquid-conducting manner in each case at least a part of the individual openings for the treatment section and/or at least some of the passages for the inlet of the treatment section, having the overall cross section of the partial-flow channel guiding element substantially identical in size in all of the blend settings as it is opened up by the untreated-water distribution element as it is formed from the sum of two partial flows, having the overall cross section of the partial-flow channel guiding element differ in size at different blend settings as the channels are effectively opened up by the untreated-water distribution element as it is formed from the sum of two partial flows, providing for an encryption between an element assigned to the filter head and an element assigned to the filter cartridge, providing a control element for an equipment-dependent positioning of the inlet valve and/or the outlet valve, having a control element for an equipment-dependent positioning of the flushing valve, having a driver of an adjustable design for the positioning of the untreated-water distribution element in its position relative to the filter head and/or filter cartridge, having a driver designed to be adjustable in its shape for the positioning of the untreated-water distribution element, having a driver that can be connected in a lockable manner to the untreated-water distribution element, having a driver designed to be pre-selectable for a certain blend ratio and having the untreated-water distribution element in the filter head designed with different partial-flow channel guiding geometries for the purpose of different uses of filter candles.

Accordingly, the present invention relates, in a first embodiment, to a water filter, comprising a filter head and interchangeable cartridge, which permits adjustment of the blend at the filter head and therefore makes it unnecessary to additionally manipulate the blend setting at the cartridge when the cartridge is changed. This water filter is distinguished in that, during the operation of installing the interchangeable filter cartridge in the filter head, the blend-adjusting element, also called the untreated-water distribution element, can be positioned on the filter head via adjustable or fixed drivers.

At the same time, the filter head is to be designed simply and cost-effectively as a result of the fact that only two liquid flows have to be guided in the filter head, a) the feed flow and b) the output filtrate stream. Furthermore, it is particularly advantageous if cartridge types which do not require separate adjustment of a blend, for example pure activated carbon candles, are provided for said filter head.

Furthermore, the input channel from the head to the filter candle and, as further higher-grade variant, the output channel from the head to the consumer is to be automatically interrupted by the filter candle when the filter candle is removed from the head. A further feature of this construction is an integrated release device for the depressurized removal of the filter candle via an automatic release and flushing valve.

It is considered to be particularly advantageous in this case if a driver is of adjustable design in its position relative to the head and/or to the filter cartridge for the positioning of the blend-adjusting element or untreated-water distribution element. It is thus possible for the blend-adjusting element of the filter cartridge, which element may also be referred to as the untreated-water distribution element, to be positioned, when a new filter candle is installed in the filter head, in such a manner that a blend ratio set previously via a corresponding adjustment element is automatically adopted.

For example, upon insertion of the filter cartridge into the head, the correspondingly positioned driver could grasp the blend-adjusting element or the untreated-water distribution element by means of corresponding engagement and could carry it along during rotation of the filter cartridge from a possibly predeterminable basic position, for example completely closed or else completely open passage position to a predetermined blend ratio setting. That is to say, the relative rotation via a longitudinal axis of the filter, which rotation is required for the operation of installing the filter cartridge, can be used at the same time for the corresponding positioning of the blend-adjusting element to the desired, predetermined blend ratio.

When said position for obtaining the desired blend-adjusting ratio is reached, the blend-adjusting element remains in its position relative to a complementary partial-flow channel guiding element which, in a first embodiment, is arranged in or on the filter cartridge. Said partial-flow channel guiding element can comprise, for example, a first inlet for the water flow which is to be filtered and a second inlet for the blending section. In order to control the respective throughflow for the two inlets, the main flow (filter section) and secondary flow (blending section), the blend-adjusting element influences the respectively effective throughflow cross section of said two inlets, in particular preferably in a manner such that, when the one effective cross section is increased, a reduction in the other effective cross section takes place at the same time, and vice versa.

However, in a particularly preferred embodiment, the partial-flow channel guiding element can also be arranged in or on the filter head, for example in order to control the partial-flow ratios independently or separately from the filter cartridge. The outlet for the two partial flows is preferably designed in such a manner that the same filter cartridge can be used for both embodiments (partial-flow channel guiding element on the filter cartridge or on the head).

This approach has the advantage that only one type of filter cartridge connection has to be provided for both embodiments, and that, when the blend ratio is changed by changing the effective cross section of an inlet, a change in pressure in the entire water filter system in the interior of the filter cartridge is not caused. A substantially constant internal pressure ratio in the filter cartridge also means that the physical and chemical filtering properties thereof remain more or less constant essentially over the entire blend-ratio adjusting range.

However, in an embodiment which is simpler by contrast, only one of the two water sections (filter section or blending section) is influenced by adjustment of the blend-adjusting element. Such an approach is provided, for example, in the case of filters of very simple construction, in which, for example, a certain blend ratio does not exactly matter. However, under some circumstances, in contrast to the embodiment described above, greater fluctuations in quality in the treated water have to be taken into account in this case.

In order to be able to provide the water filter for combination, if appropriate, with a certain filter cartridge, it may also be entirely advantageous for one or more drivers to be designed such that they are adjustable in their shape for the positioning of the blend-adjusting element. By this means, for example, the same carry-along device could be used for a corresponding effect on different filter cartridges in different applications. For example, in conjunction with one and the same type of filter head, this could enable a system of water filters to be constructed, in which only the filter cartridges would have to be constructed differently for certain intended uses, wherein the combination could then be connected in each case, for example, via corresponding shaping of the driver. However, in principle, it is also entirely possible for an adjustment option to be provided for the position of the driver, for example in a sectional plane of the water filter or of the filter cartridge. Different radial distances through the longitudinal axis of the water filter or of the filter cartridge in combination with the abovementioned features are also entirely conceivable.

A lockable connection between the driver and the blend-adjusting element makes it possible, after the filter cartridge is installed on the water filter head, for the blend ratio to be adjusted to any adjustable blend ratio value desired, since the blend-adjusting element can be adjusted both forward and backward on account of said fixed connection.

It is considered to be particularly advantageous in this case if the driver is designed to be pre-settable for a certain blend ratio. By this means, for example, a water quality envisaged for certain applications, can be pre-set, for example for drink preparation machines, such as, for example, hot drink appliances, but also for cooling appliances or cleaning appliances, the water quality requirement of which may significantly differ.

Furthermore, the present invention relates to a water filter, comprising a filter head, an interchangeable filter cartridge, a blending device and an adjusting device for adjusting a partial-flow ratio between at least two flow paths, wherein at least one flow path comprises a filter section. The second or yet another flow path may be, for example, a further filter section, a blending section for mixing the water guided over the filter section with a preferably adjustable portion of untreated water possibly guided over a carbon filter, or a different water treatment section. The water filter is distinguished in that the adjusting device comprises an untreated-water distribution element arranged in or on the filter head and a partial-flow channel guiding element which is complementary with respect thereto and is arranged in or on the filter cartridge.

In addition to the advantages already stated for the first embodiment provided above, this embodiment of a water filter additionally has the advantage that the blend setting between the filter section and bypass section takes place by means of two complementary blend-ratio adjusting elements which can be joined together and/or positioned in relation to each other only when a filter cartridge is fitted into a filter head, and therefore an intended or unintended manipulation and an associated, possibly incorrect use of the filter cartridge is made more difficult or impossible.

In particular, this advantage can be achieved in that the untreated-water distribution element is designed as part of the filter head, for example as a sleeve and/or ring with at least one passage element or blocking element, such as, for example, an opening or a covering or a closure for an opening, which closure can interact with a complementary element on the filter cartridge. It can be correspondingly pre-positioned by arrangement in the filter head. By this means, if appropriate, an otherwise required orientation of the blend-adjusting element in its position relative to the filter head until a first, basic operation to adjust the blend ratio can be omitted. Adjustment of the relative position of the two mutually complementary elements when a new filter cartridge is inserted is therefore no longer required. It arises automatically through the old blend setting and the installation-induced operating position of the filter cartridge. Nevertheless, an optionally required readjustment of the blend ratio by actuation of a corresponding adjustment element acting on the untreated-water distribution element is possible.

However, also for the second embodiment, in which the partial-flow channel guiding element is arranged in the head, these advantages additionally apply in addition to the option for adjusting the two partial flows separately from the filter cartridge.

If the untreated-water distribution element is designed as an element which can be inserted into the filter head, a corresponding water filter can again be designed as part of a water filter system in which, for different applications, the same head can be combined with different untreated-water distribution elements and, as a result thereof, also with different filter cartridges. And conversely, with the same adjusting element and different filter candles, different channel flow guiding geometries could be realized, i.e. candles with a different flow characteristic could be realized with the same head, and vice versa. For this purpose, different embodiments for the connection between the untreated-water distribution element and the filter head are also conceivable. For applications in which it is of primary importance that manipulations can be reliably prevented, the use of a nonreleasable connection between the untreated-water distribution element and the filter head is recommended.

In the case of applications in which value is placed more on a flexible use of different filter cartridges, as, for example, if an option is provided for the connection of different appliances, such as drink preparation machines, refrigerators or cleaning appliances, by contrast a releasable connection between the untreated-water distribution element and the filter head can be considered advantageous. To increase the security against manipulation, in this case, for example, a special tool for re-releasing an untreated-water distribution element which is already installed can be provided. Such a tool is advantageous in particular if the untreated-water distribution element is designed as an interchangeable element.

Furthermore, in order to operate or to adjust the untreated-water distribution element, a control element which comprises, for example, an adjustment member can advantageously be provided. In a simple embodiment, this can be, for example, an adjustment wheel with a corresponding connection to the untreated-water distribution element. However, in a superior embodiment, adjustment by means of a motor or with another suitable adjustment means is also entirely conceivable, for example if, due to the period of operation or other causes, the water quality demanded no longer corresponds to the water quality desired and accordingly a readjustment operation appears to be required.

In principle, a control element of this type can therefore comprise a control circuit which, under some circumstances, also checks the quality of the filtered water and, if the need arises, readjusts and particularly advantageously also locks the blending-section setting, for example using a corresponding positioning unit.

For this purpose, the untreated-water distribution element can comprise at least one passage element and/or covering element which interacts, for example in the manner of a diaphragm, with the opening assigned to it in each case for the filter section or for the bypass section. Accordingly, when the untreated-water distribution element is rotated, the active throughflow cross section of the one or other section is changed, or, in a particularly preferred embodiment, the two passage cross sections are changed in a complementary manner such that the overall remaining, effective overall passage cross section remains the same in order to maintain a substantially constant internal pressure of the system. As a result, a uniform blending filtering action which is substantially independent of the throughflow volume can be brought about for all of the filter cartridges installed in a filter head, and even for different blend settings.

The untreated-water distribution element may be in different forms, for example in the form of a ring or disk. Such an embodiment in the form of a disk or ring can realize, for example, the above-described diaphragm effect by covering or opening up the two, or if appropriate also more, feeds, filter section or bypass section using two elements oriented in a planar manner with respect to each other.

However, in contrast to being in the form of a ring or disk, or else in addition, the untreated-water distribution element may also be in the form of a sleeve. This can be realized, for example, by two or more tubes or sleeves which are oriented coaxially with respect to one another being arranged such that they can be correspondingly positioned in relation to one another, with at least one of the two sleeves having at least one through-opening, but preferably having a plurality of through-openings, which opening or openings is or are covered or opened up by the other sleeve during a displacement movement of the two sleeves relative to each other. This relative displacement movement between the two sleeves can take place, for example, via a correspondingly provided thread which can be actuated, for example, by one of the above-described adjustment means. However, other adjustment mechanisms, such as tension and/or compression means, preferably in combination with locking means, are also conceivable.

The partial-flow channel guiding element which is complementary to the untreated-water distribution element preferably has at least one filter section inlet and at least one blending section inlet or filter section inlet or water treatment section inlet. Depending on the application, the filter section inlet and/or the blending section inlet or the filter section inlet or water treatment section inlet can also have a plurality of inlet openings. This makes it possible, for example, to influence the flow ratio in the filter cartridge, but there may also be cause for such a construction for coarse pre-filtering reasons, such that relatively large particles deposited in the pipe cannot first penetrate the filter and possibly clog it up.

Depending on the application and/or embodiment of the two elements which adjust the blend ratio, the inlet openings may be of slot-shaped design and/or also of predominantly circular to oval design.

With all of the embodiments provided above, it is basically possible for the overall cross section of the partial-flow channel guiding element that is effectively opened up by the untreated-water distribution element and is formed from the sum of the two partial flows to be identical in size essentially in all blend settings such that a predominantly consistent internal pressure ratio in the system and a blend ratio which is largely independent of the throughflow volume are ensured.

However, in addition to this particularly preferred embodiment which ensures a substantially constant internal pressure ratio, it is entirely also possible for a different variation of the respectively individual, effective partial flows through the partial-flow channel guiding element to be provided in conjunction with the untreated-water distribution element. In a particularly simple embodiment, for example, the effective cross section of just one of the two section feeds, the filter section or bypass section, could be influenced.

In order to increase the operational reliability and to reduce a possibility of manipulation an encryption is formed between an element assigned to the filter head and an element assigned to the filter cartridge. Such an encryption preferably has axially extending, complementary elements. One embodiment of such an encryption would be realized, for example, by means of a toothing. This toothing can comprise one or more teeth engaging in correspondingly complementary recesses and, in a particularly preferred manner, bringing about an actuation of elements which are arranged in the head and are activated or deactivated by means of a rotational movement. An element which is actuated in such a manner is for example, an inlet valve, an outlet valve and/or a release valve, an untreated-water distribution element and/or a combination of said elements individually or of a plurality of said elements.

An encryption element of this type can therefore at the same time also be a control element for an equipment-dependent positioning of the inlet valve and/or outlet valve of a release valve or the like. However, this is not absolutely required, and therefore it could be entirely possible for a corresponding control element to be designed as a separately formed adjustment element, for example in the form of an adjustment ring and/or an adjustment sleeve. These in turn can comprise a further actuating element, such as, for example, an actuating cam and/or adjustment cam, a guide edge and/or adjustment edge, or more of the like.

BRIEF DESCRIPTION OF THE SEVERAL VIEWS OF THE DRAWING(S)

The present invention is explained in more detail below with reference to the attached figures and the description which makes reference thereto.

Figure 1A:
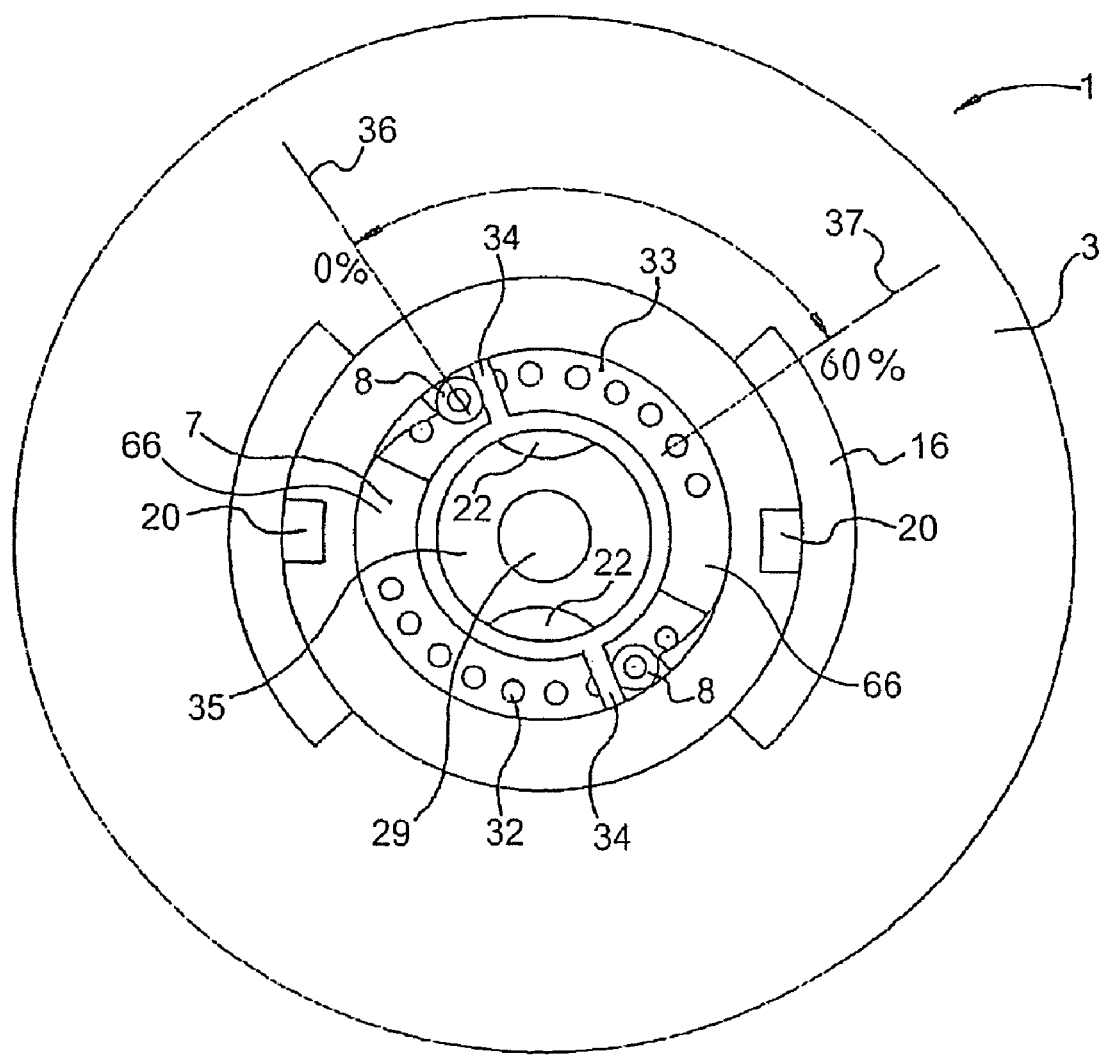
Figures 2, 2A, 2B:
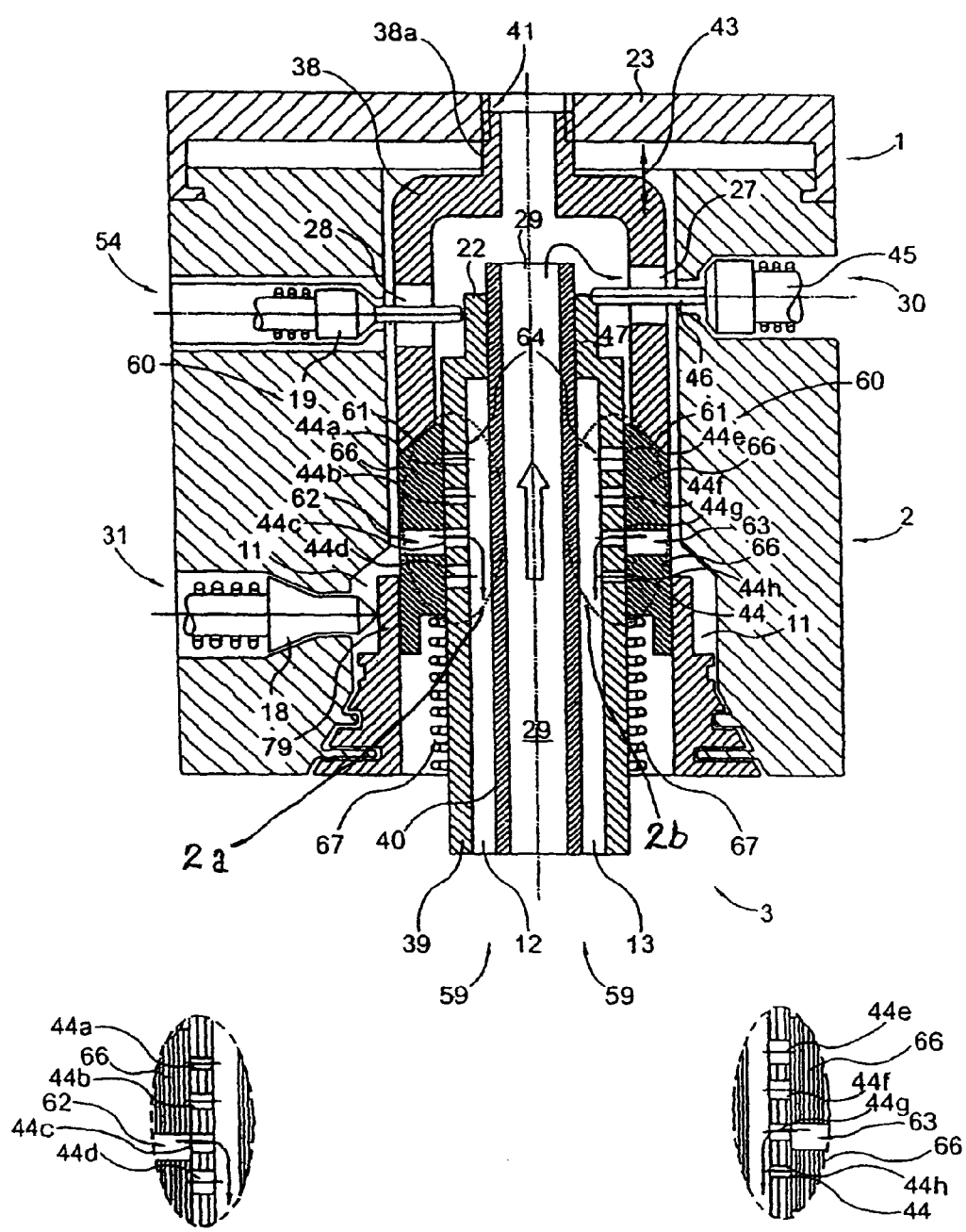
Figure 4:
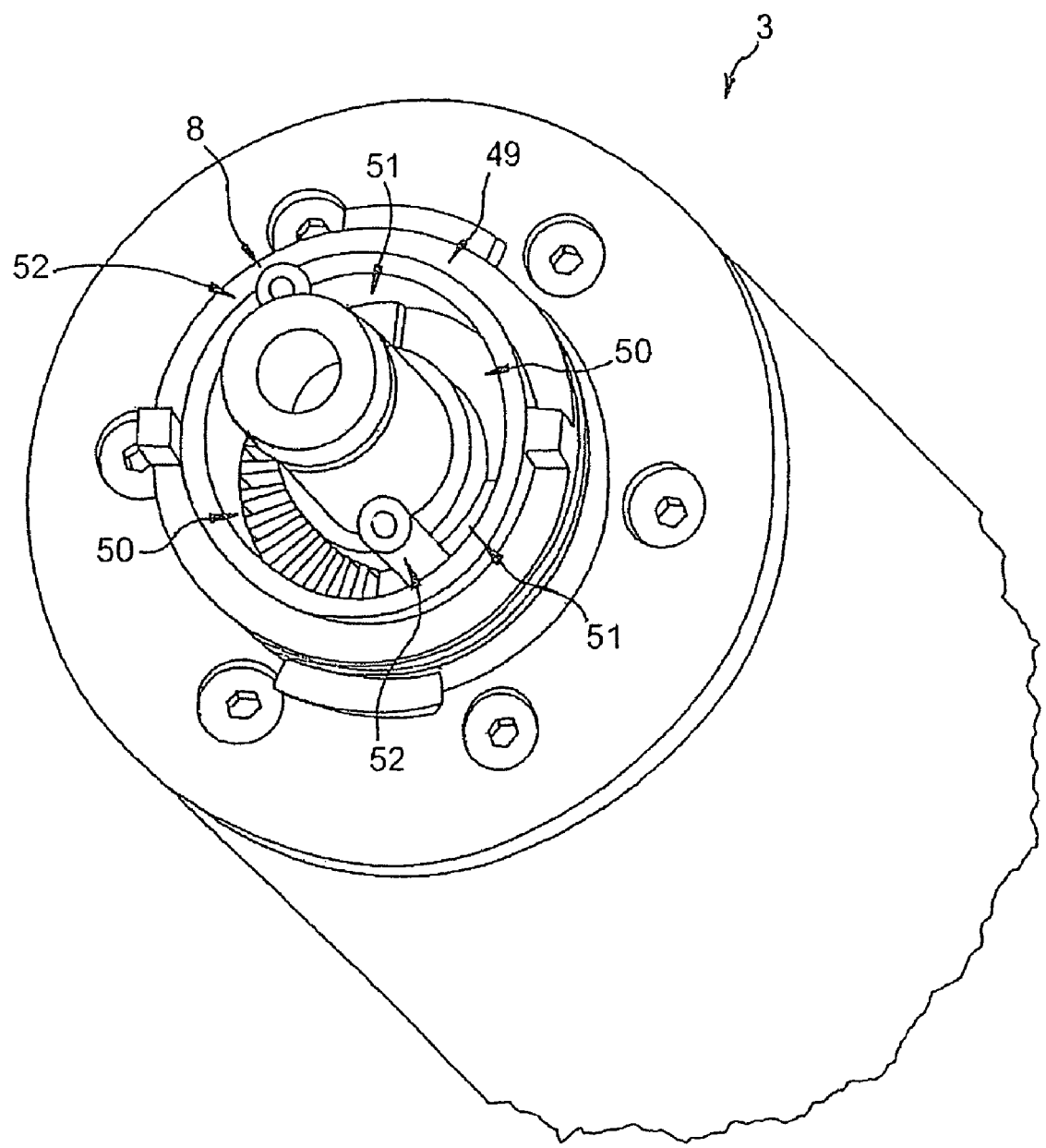
Figure 5:
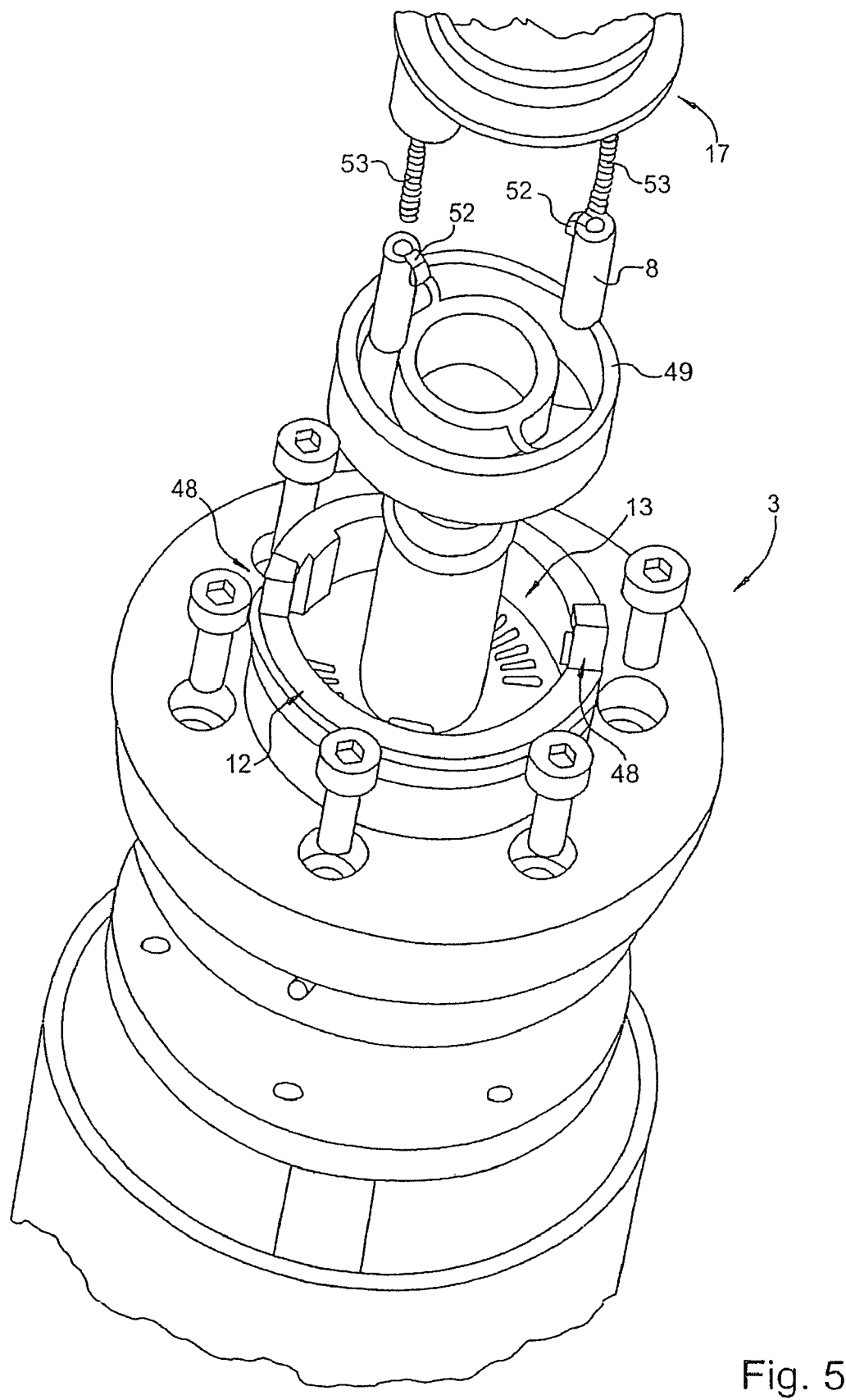
Figure 6:
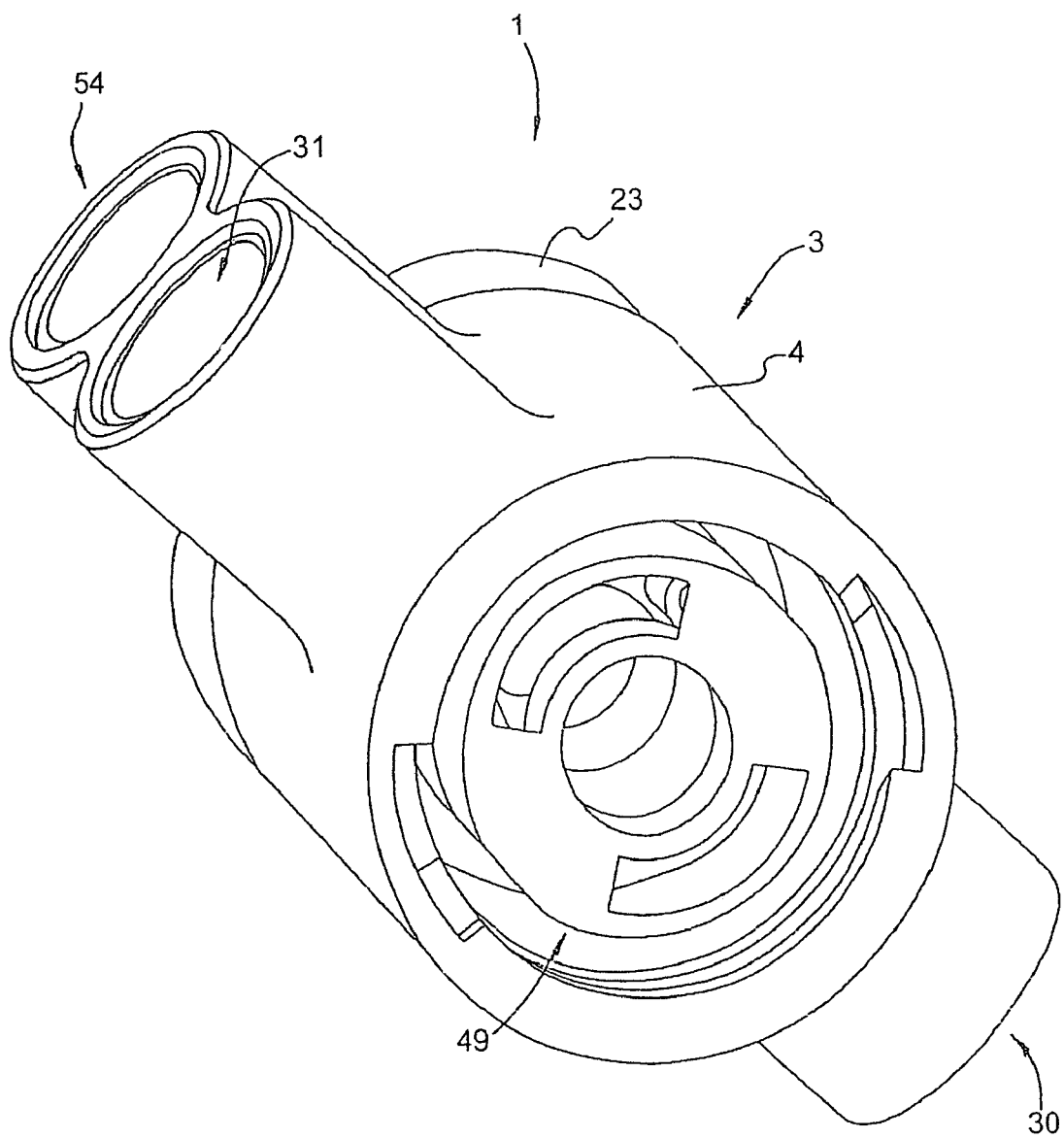
Figure 7:
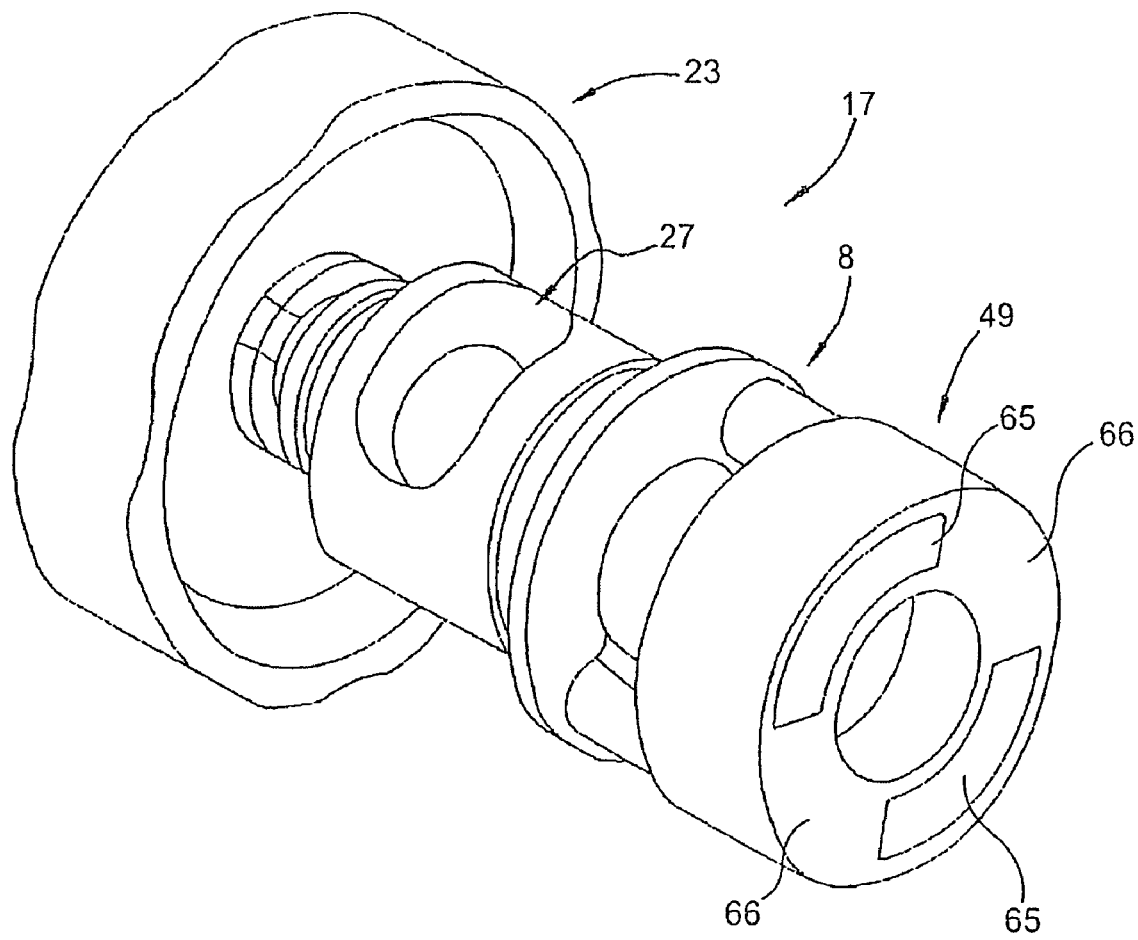
Figure 8:
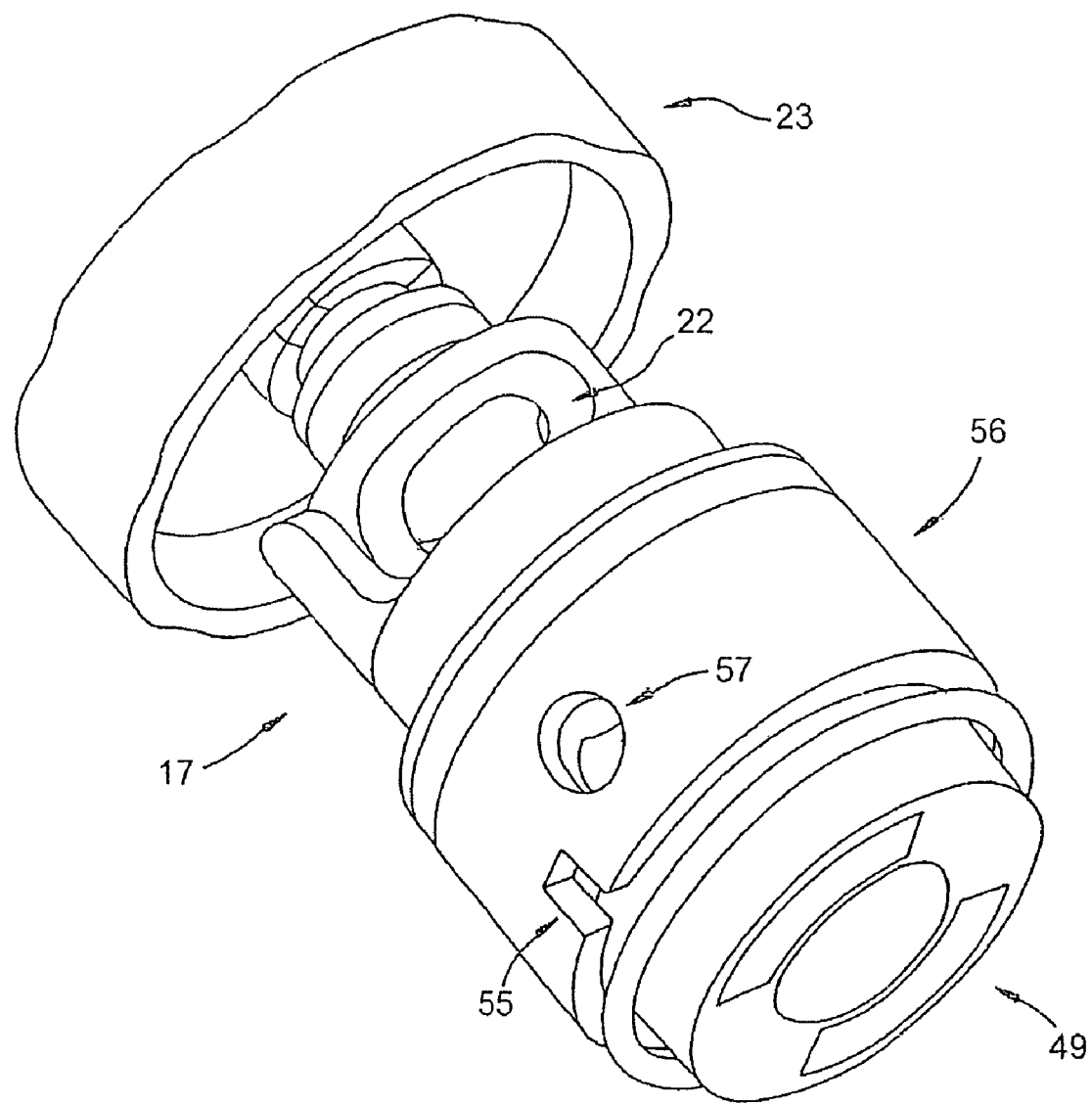
Figure 9:
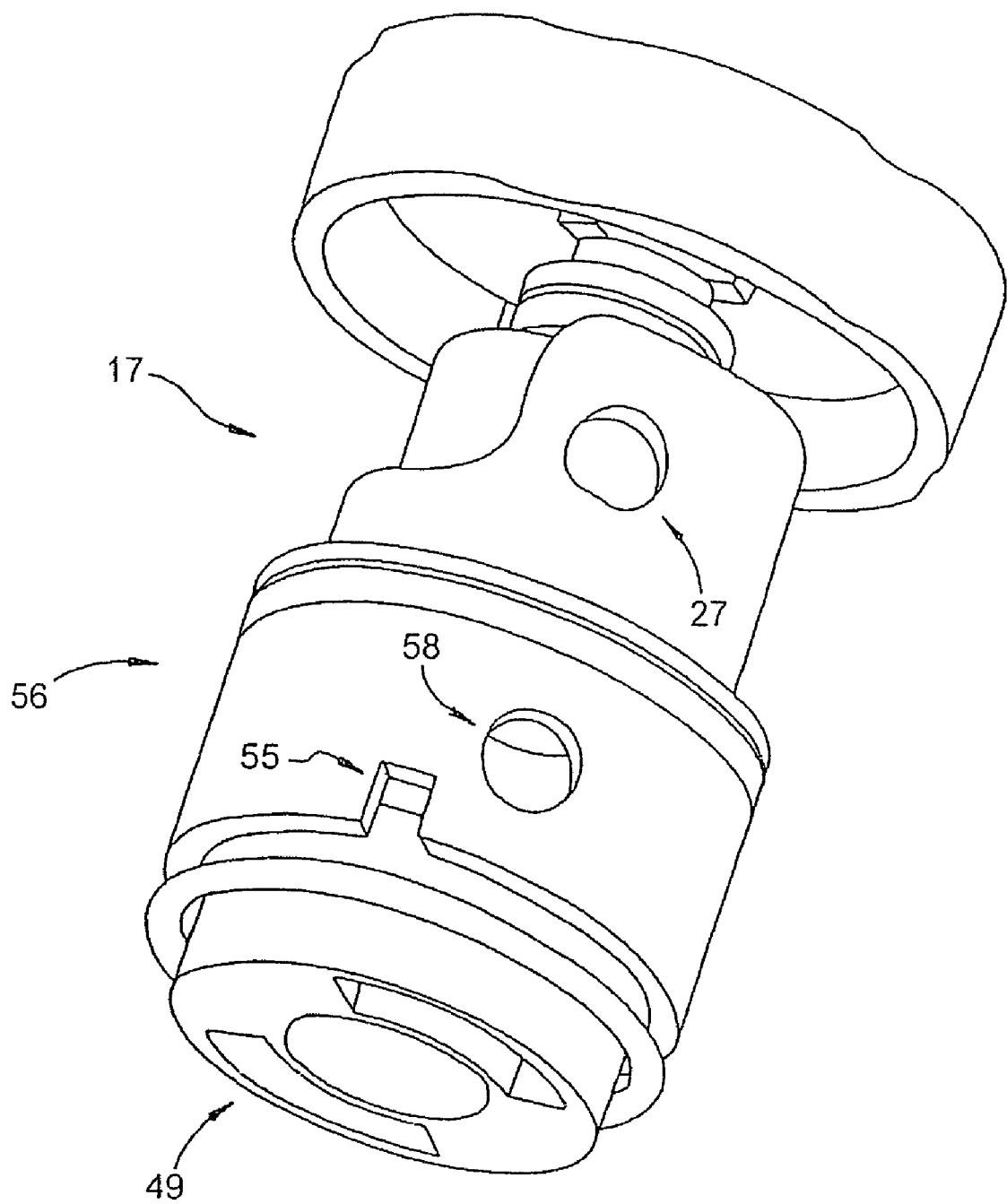
Figure 10:
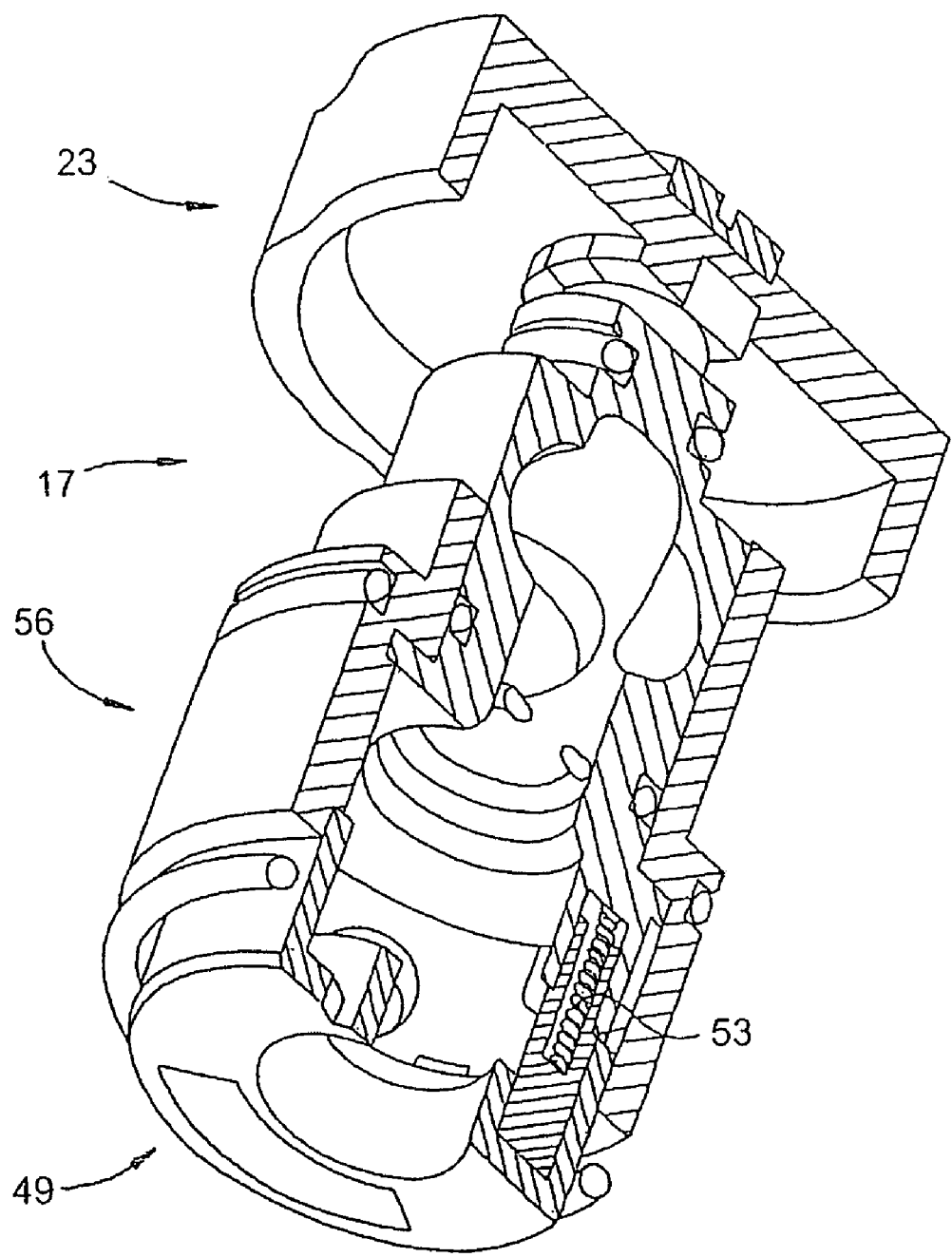

In the figures:

FIG. 1 shows a schematic sectional illustration through a water filter, comprising a filter head, an untreated-water distribution element or a blend-adjusting element or blend adjusting sleeve and an interchangeable filter cartridge in a longitudinal section, FIG. 1a shows the filter cartridge from FIG. 1 in top view taken across the line indicated by reference arrow 1a, FIGS. 2, 2a and 2b show an embodiment modified in relation to the embodiment in FIG. 1 with enlarged detail of FIG. 2 in FIGS. 2a and 2b, FIGS. 3 to 5 shows schematic, perspective views of a filter cartridge in different equipment illustrations, FIG. 6 shows a bottom view of a filter head with an untreated-water distribution element illustrated schematically therein, FIGS. 7 to 9 show an untreated-water distribution element with a fixing and adjustment element which is assigned thereto in differently oriented, schematic illustrations, FIG. 10 shows a longitudinal section through the elements illustrated in FIG. 9, and FIGS. 11 to 22 show a schematic illustration of various views of further embodiments.

DETAILED DESCRIPTION OF THE INVENTION INCLUDING BEST MODE

The system of the water filter 1 comprises a filter head 2, which is permanently installed and is connected to the drinking water supply, and a filter candle 3 which is interchangeable. The filter candle, which is also referred to as the "filter cartridge" with the same meaning at a different point of the description, is interchanged after the treatment media are exhausted or after a period of use (FIG. 1).

The filter head 2 substantially comprises a filter head housing 4 which comprises two concentric bores 5, 6 of differing diameter in order to receive the filter cartridge 3. Similar head/candle adaptations are already known on the market.

The inventive novelty of this construction is a blend-adjusting sleeve 17 having one or more drivers 8 and being arranged in the filter head 2 in a manner such that it can be rotated from the outside. The blending portion can be adjusted in an infinitely variable manner or in graduated values (for example 0%, 10%, 20%, 30%, 40%, etc.) by latching by means of rotation of the blend-adjusting sleeve 17 on the head 2. In order to actuate the blend-adjusting sleeve 17, an adjustment wheel 23 is provided, for example in the form of a cap, the adjustment wheel being connected to the blend-adjusting sleeve 17 via a corresponding driver in a manner transmitting a rotational movement. The adjustment resistance of said cap in order to rotate the blend-adjusting sleeve 17 which is connected thereto can be influenced, for example, by the frictional resistance of the seal 25 in relation to the housing 4 and/or to further contact surfaces between the blend-adjusting sleeve 17 and the housing 4. Depending on the application or embodiment, a latching position 24 can additionally be provided, such as, for example, here by pre-stressing the outer cap edges in relation to the outside of the housing 4 that faces them. The latching positions can be formed for this, for example by means of a mutually engaging toothing or the like. For example, a screw 26 can be used as the means of fixing the cap 23 to the blend-adjusting sleeve 17. However, snap fastenings or other suitable connections are also conceivable.

In order to be able to allow the filtered water flow being discharged from the filter cartridge 3 through the filter output 29 to be able to be discharged from the filter head via the outlet 30, the blend-adjusting sleeve 17 has a correspondingly arranged and designed opening 27 for the passage of the filtrate flow. A second opening 28 is provided here located opposite in the blend-adjusting sleeve 17 for access to a release and/or flushing valve 19. According to the invention, the water flow flowing into the filter head through the inlet 31 can be divided into a filter section 12 and a bypass section 13 of a blending device 59, can flow through the filter device and can leave again with the desired or set water quality through the outlet 30.

The filter cartridge 3 has two sealing elements 9, which outwardly seal the cartridge: one seal 10 for separating off the entire filtrate and one for sealing 9 the untreated-water feed.

According to the invention, a blend-adjusting ring is integrated as the "untreated-water distribution element" into the untreated-water feed 11 of the cartridge and divides up the untreated-water into the feed of the candle 3 and the separate treatment sections for, for example, softening 12 and blending 13. The untreated water is divided up via a rotatable ring 7 which, together with the passages 14, 15 of the filter cartridge cover, forms a diaphragm which, depending on the angular position of the ring 7 with respect to the passages 14, 15, seals or opens up the passages 14, 15 for the blending channel 13 and main treatment channel 12. In this connection, it is particularly favorable if, when the passage 13 to the blending section is reduced in size, the cross section of the passage through the treatment section 12 is enlarged at the same time, and vice versa.

In the construction described here, the inlet 12 for the water which is to be treated is offset by circa 180° with respect to the inlet 13 for the blending water. The precise position of the inlets for the treatment channel and the blending water channel in the candle 3 can be coordinated individually by the blend-adjusting ring 7 in order to obtain the desired blend setting and the corresponding flow resistances as a function of the angle of rotation of the blend-adjusting ring 7.

In a first embodiment, in which the blend-adjusting ring 7 is arranged on the filter cartridge 3, the rotation of the ring 7 is carried out automatically (inevitably) during the installation of the filter cartridge 3 into the filter head 2. For this purpose, it is required for the connection between the filter head and filter cartridge to be produced by, for example, a bayonet 16 with at least two tabs. A rotational movement of approx. 90° can then be carried out. If the bayonet tabs are smaller than the apertures, then in principle angles of rotation of greater than 90° are also possible. However, an angle of rotation of approx. 90° is preferred for an embodiment with two bayonet tabs.

In order for it to be possible to preset the blend at the filter head, the rotatable ring 7, just like the blend-adjusting sleeve 17, has to have at least one driver hook, preferably two driver hooks. If the cartridge 3 is then installed (the bayonet closed), then after a certain angular position during the installation, the driver hooks of the blend-adjusting sleeve 17 and rotatable ring 7 meet. If the installation or rotational movement is now continued as far as the closure position of the bayonet, the rotatable ring is secured by the driver hook of the head, and the cartridge continues to rotate under the ring 7 (which is relative to the head) and therefore adjusts the blend setting of the filter cartridge 3.

In order to ensure the blend setting according to the invention at the ring 7 of the filter cartridge 3, it is advantageous if the ring 7 is in an initial position prior to installation. Depending on the design of the construction, the two extreme positions for the adjustment of the ring are suitable for the initial position. These are the positions of the ring which permit complete closure of the blend or maximum opening of the blend. In the first case, depending on the position of the driver hooks of the blend-adjusting sleeve, the blend of the filter candle can be open to a greater or lesser extent in relation to the initial position, and, in the second case, depending on the position of the driver hooks of the blend-adjusting sleeve, the blend can be closed to a greater or lesser extent in relation to the initial position as the filter cartridge is being screwed into the head. The central concept of this construction is the use, during installation of the filter candle 3 into the filter head 2, of the rotational movement via the bayonet connection 16 in order to set the blend ratio.

As already described above, the rotational movement is used for blend setting during installation. This rotational movement can also be used for actuating a feed valve 18 and/or a release/flushing valve 19. Such a use of the rotational movement during the installation of the filter candle into the head is known, for example, from Bassett, et al. U.S. Pat. No. 6,949,189 B2. A closure value is formed here in the filter head by means of two sleeves which are inserted one inside the other and have suitably arranged holes and sealing elements, with the actuation of the rotating valve taking place by means of drivers on the cartridge. This construction cannot be combined with the abovementioned blend setting. A new type of valve actuating mechanism using a cam 20 and valve tappet 21 is therefore provided. Constructions of this type are otherwise only known in the region of faucet filters ("faucet mount-water filter"), with the valve elements being actuated here by means of an operating lever via a separate actuating shaft.

The actuating shaft here is the axis of symmetry of the filter cartridge cover. Accordingly, at least one cam 20 (for reasons of symmetry preferably two cams) is attached to the cartridge cover according to the drawing and pushes back the valve tappet 21 when the bayonet connection is closed, as a result of which the untreated-water feed is opened up. If the filter cartridge is removed from the filter head, the feed valve 18 is closed. The actuating cam 20 can preferably be arranged above the outer sealing element 9. An angle of rotation of 5 to 50°, preferably 10°, suffices in order to open the untreated-water valve 18 (feed to the cartridge). To release the filter candle prior to removal of the cartridge, a driver 22 is provided above the second sealing element 10 of the filter cartridge cover, which driver actuates a second valve 19 (for example disk valve) in the filter head, see drawing. Said valve 19 is closed when the filter cartridge is removed. The second valve 19 is likewise closed when the filter cartridge is installed in the filter head or the bayonet is completely closed. The actuation, i.e. opening of the valve 19, takes place by means of the driver 22 (for reasons of symmetry preferably two drivers) which is designed as a hook and hence hoists up the second valve 19. The valve is hoisted up within an angular range of the bayonet where the untreated-water valve 18 is closed and the filter cartridge is secured in the approximately half-closed bayonet.

It is now possible to equip the second valve 19 with an additional pulling mechanism which can be actuated from the outside. This can take place via a screw construction or the like. This valve 19 can then also therefore be actuated manually in the installation position, as a result of which this valve can then additionally be used as a flushing valve for starting up the filter cartridge.

In order to maintain the automatic operation as a release valve, the manual actuating mechanism has to be provided with a sufficient amount of play. (In the case of a manually actuated valve, the actuating hook of the cartridge must not collide with the valve. Conversely, in the closed position, the manual actuating mechanism must not obstruct automatic opening via the hook).

FIG. 1a shows a top view of the cartridge 3 of the water filter 1 from FIG. 1. The filter output 29 through which the filtered water flow leaves the cartridge 3 is illustrated centrally in the center. Thereabove and therebelow, the two drivers 22 which are arranged on the end side of the outer wall 35 of the filter output 29 and are intended for actuating the release and/or flushing valve 19 can be seen.

Referring now to FIG. 1 and FIG. 1a the blend-adjusting ring 7 borders the outer wall 35 and has two segments with a plurality of openings 32 for access to the filter section and a plurality of openings 33 for access to the blending section or bypass section. A possibility of adjusting the blend ratio between 0% and 60% is illustrated by way of example, corresponding to the two adjustment positions or angular positions 36 and 37, as a function of the related angular adjustment of the blend-adjusting ring 7 in a relative position to the filter cartridge 3 positioned in this manner or to the inlets 14 thereof for the main flow or filter flow or 15 (FIG. 1) for the bypass section or blending section.

The corresponding adjustment of said blend-adjusting ring 7 takes place by means of rotation of the cap 23 and a corresponding transmission of this rotational movement by the blend-adjusting sleeve 17 and the drivers 8 which are arranged between the blend-adjusting sleeve 17 and the blend-adjusting ring 7. In this embodiment according to FIG. 1a, two stops 34 are provided for the drivers 8, which stops are pressed against the drivers 8 when the cartridge is screwed in and thus fix the blend-adjusting ring 7 relative to the head and therefore bring about a relative adjustment movement in relation to the cartridge in order to adjust the blend ratio in accordance with the positioning of the cap 23.

In order to permit a change in the blend ratio adjusted automatically in this manner, furthermore a means of fixing is provided between the drivers 8 and the blend-adjusting ring 7, preferably in a latching arrangement, for example by resilient engagement of the pins in correspondingly provided depressions. As a result, the blend-adjusting ring 7 can be rotated both forward and backward by means of the cap 23 in order to permit an increase or reduction in the blend ratio during this automatic blend-adjusting operation too.

The two cams 20 for the actuation of the inlet valve 18 are arranged approximately in the angular position of 90° and 270° radially on the outside of the blend-adjusting ring 7. The number of such cams 20 corresponds particularly advantageously to the number of fastening elements 16, arranged radially to the outside, as seen in the top view, of the filter cartridge 3, here in the form of bayonet closures, such that the cartridge can be inserted into the filter head irrespective of its particular angular orientation with respect thereto and can be connected thereto without error and such that it is operationally ready. Erroneous operation is thereby prevented.

FIG. 2 shows a water-filter embodiment which is modified in relation to FIGS. 1 and 1a to the effect that the blend setting here does not take place via an adjusting ring 7 which can be adjusted radially relative to the two inlet openings 14 for the filter main section and 15 for the bypass section, but rather via two coaxially arranged, sleeve-shaped elements 39 and 61 which can be displaced axially in relation to each other.

The relative position of the two sleeves 61 and 39 with respect to each other, which sleeves are provided with passages 62, 63 and openings 44a-h, can be influenced by means of an adjustment member, here by way of example in the form of a sleeve 38. The position of the untreated-water distribution sleeve 61 is advantageously stabilized by a resetting element, here illustrated, for example, as a special spring 67.

In the same manner as for the radial blend setting, the sleeve 38 is connected suitably to the adjustment wheel or the cap 23 in order to transmit a rotational movement. However, in a departure from the above-described, radial blend adjustment, it can be adjusted in its positioning in the longitudinal direction corresponding to the arrow 43, for example by means of a threaded connection 41 between the cap 23 and an extension 38a of the sleeve 38.

In this exemplary embodiment, the blend setting is realized in a graduated manner. For this purpose, the supply of untreated water is adjusted, preferably in certain mixing ratios, via the opening up of complementary passages 44a-h for the filter section 12 and for the blending section 13. In order to adjust said mixing ratios, for example, the two passages 62 and 63 of the untreated-water distribution sleeve 61 can each be designed to be identical in size. However, the complementary openings 44a and 44e, 44b and 44f, 44c and 44g and also 44d and 44h, which are effective for the passage, are graduated in an opposed manner from large to small for 44a-44d and from small to large for 44e to 44h.

In this example, the opening up of only two complementary openings 44a to 44h through the two passages 62 and 63 is provided in each case. However, in modified embodiments thereof, other passage combinations are also possible in order, for example, to permit an, if appropriate, more refined and/or less sudden adjustment of the blend ratio.

The complementary, coaxial sleeve 39 is designed as the neck of the cartridge 3 and is provided with the above-described openings 44a-h, which are preferably each graduated in an opposed manner in cross section, for the entry of the water flowing in through the feed valve 18 into the filter section via the channel 12 or into the blending section via the channel 13. The feeding of the water is illustrated by the individual arrows which are shown in the chamber 11 flowing around the sleeve 61 and thus enter both from the left and the right in the sectional illustration through the respective opening 62 and 63. The exit of the filtered water takes place correspondingly in turn through the filter output 29 and additionally here via the passage of an outlet valve 45. The latter is controlled by the relevant cam 47 via a, valve tappet 46.

In a modified embodiment, it is also possible, for example, for a preferably central "spike" to change its height as a function of the position of the "bypass-adjusting cap" 23, and, in the process, to close a different number of passages, for example in the form of bores, in a correspondingly assigned inlet channel of the filter candle in order to adjust the blend ratio. Such an inlet channel is preferably provided with at least one axially oriented row of holes in the region of the filter candle neck. This affords advantages on account of a relatively simple construction both with regard to production and installation.

In addition, a cam 22 for controlling the flushing or the release valve 19 and a cam 47 for activating the outlet valve 45 are illustrated purely schematically. The outlet valve 45 is to be opened by a cam 47 whenever the cartridge is fixedly screwed into it, and the flushing or release valve is to be opened only briefly during the screwing-in operation or briefly during the unscrewing operation in order, when a new filter cartridge is screwed in, to be able to briefly flush the latter and, when unscrewing it, to make it possible to relieve the filter 1 from pressure via a discharge line provided for this purpose. In order to control the inlet valve 18, an extension or cam 79 is provided, for example in the lower neck region of the filter cartridge, in order to actuate the inlet valve 18 during insertion or removal of the cartridge.

In this embodiment, as already partially explained above, the blend ratio is activated by adjustment of the adjustment wheel 23. In this case, axial displacement of the sleeve 38 takes place by means of the rotational movement of the adjustment wheel, and, as a result thereof, a displacement of the untreated-water distribution sleeve 61 takes place. Said sleeve covers the sleeve 39 of the filter cartridge coaxially and closes or opens up, depending on the embodiment and corresponding positioning, two or more of the complementary openings 44a-h for the entry of untreated water into the filter. An opposed closure ratio between the effective cross section of the main flow, i.e. of the filter flow, and the effective cross section of the blending section, i.e. of the bypass flow, causes the internal pressure ratio in the filter 1 and a blend ratio which is largely independent of the throughflow volume to remain the same for all blend settings and therefore for a filter effect remaining essentially the same over the entire blend setting to be able to be obtained.

The two filter sections 12 and 13 are delimited in terms of piping by the sleeve 40 in relation to the filtrate flow leaving the filter via the filter output 29.

Figure 3:
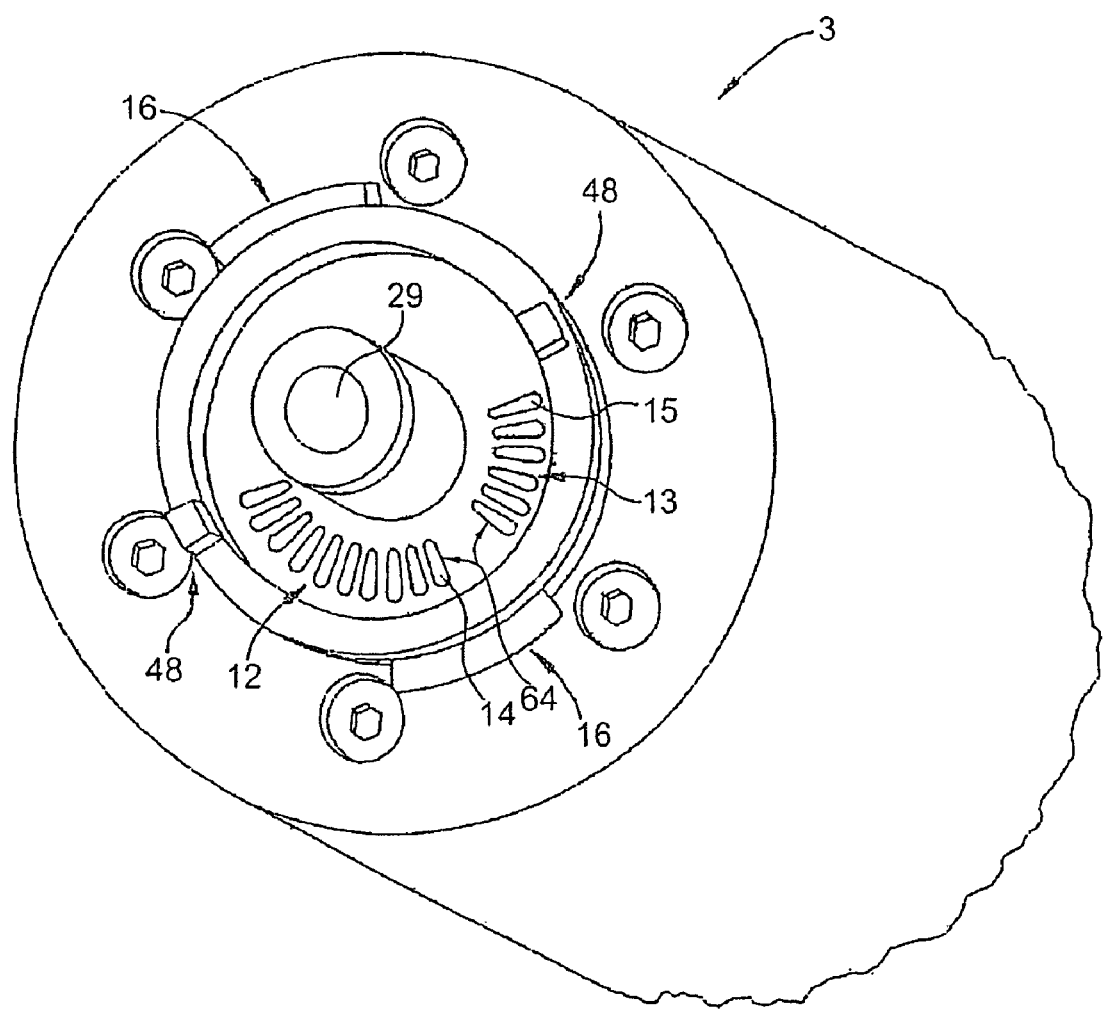

FIG. 3 shows a perspective top view of a filter cartridge 3 with the filter output 29 visible on the end side and with the two inlets 12 for the filter section and 13 for the blending or bypass section. The inlet to the filter section 12 and the inlet to the blending section 13 are in each case illustrated by means of a covering with openings 14 and 15 having elongate slots. Said openings can serve, for example, as coarse filters for relatively large particles fed in the untreated water. In addition, two radially oriented key elements 48 are also illustrated, said key elements being able to ensure, for example, that only filter cartridges provided in each case for the relevant filter head can be used. They preferably engage in correspondingly complementary recesses on an element of the filter head and, in a particularly preferred manner, can also serve for the actuation of further elements in the head, for example for the actuation of valves or the like.

Corresponding to the illustration of FIG. 3, FIG. 4 in turn shows a filter cartridge 3, here supplemented by a blend-adjusting element 49 which, in this embodiment, can be assigned, for example, to the cartridge. In an embodiment which is modified by comparison, the blend-adjusting element can also be assigned, however, to the filter head, thus resulting in a two-part blend-adjusting device which brings about additional security against intentional and/or unintentional manipulation.

The blend-adjusting element 49, which is also referred to as the untreated-water distribution element, is divided approximately in a segment-like manner into two passages 50 and two coverings 51. Its manner of operation becomes clear by comparing the two FIGS. 3 and 4. Depending on the relative position of the blend-adjusting element 49 with respect to the opening 14, 15 of the filter section 12 and to the blending section 13, a change in the respective effective throughflow cross section is brought about, to be precise, particularly advantageously to the effect that, for all settings of the blend ratio, a substantially constant, entirely effective throughflow cross section is maintained, as is therefore a substantially constant internal pressure of the filter. Upon rotation in the clockwise direction, an increase in the effective throughflow cross section for the filter section 12 and a reduction in the effective throughflow cross section for the blending section 13 are brought about. Upon a rotation in the counterclockwise direction, an accordingly oppositely directed effect is obtained.

The two drivers 8 each have a fixing element 52, illustrated here, for example, in the form of a spring-elastic clamp element. When the filter head 2 is equipped with a corresponding filter cartridge 3, said spring-elastic clamp element can be pushed onto a corresponding counterpart and can be fastened thereto via the clamp effect. Depending on the embodiment, this fastening can be designed with a nonreleasable or else as a releasable fastening. The re-releasable embodiment can be removed again, for example, by a corresponding securing resistance being overcome.

FIG. 5 shows a further schematic illustration in an exploded arrangement of individual elements of the water filter 1. FIG. 6 shows a bottom view of a housing 4 of the filter head 2 with the blend-adjusting element or untreated-water distribution element illustrated schematically therein as a complementary part with a partial-flow channel guiding element, which both together form the blend-adjusting device according to FIG. 4. As explained above, depending on the embodiment, the blend-adjusting element 49 can be assigned to the filter head 2 or to the filter cartridge 3. The three connections of the filter head 2 are the inlet 31 for the feeding of untreated water, the outlet 30 for the removal of the filtrate flow, and the release and flushing outlet 54 for the guided disposal of the water discharged via the release and flushing valve.

FIGS. 7 to 9 show further views of individual elements for the water filter 1. FIG. 7 shows the adjusting cap 23, and the blend-adjusting sleeve 17 which is connected thereto, transmits the rotational movement and has the opening 27 formed therein for the exit of the filtrate flow in the direction of the outlet 30. The blend-adjusting element 49 is connected to the blend-adjusting sleeve 17 in a manner coupled thereto via the drivers 8. A further corresponding illustration can be seen in FIG. 8 which is supplemented in relation to FIG. 7 by the additional valve body 56 which is illustrated.

This valve body 56 has a valve opening 57 as an inlet valve which can be actuated, for example, by the encryption element 55, which is complementary to the encryption element 48 (FIG. 5), with regard to an open position or a closure position by rotation during screwing in or unscrewing of the filter cartridge. The same applies to the illustration in FIG. 9, in which an additional opening 58 is illustrated in the valve body 56. This valve body 56 can be inserted and used through this additional valve opening 58 in various embodiments of filter heads having sometimes different filter functions. It is therefore a multi-functional valve body 56.

FIG. 10 finally shows a sectional illustration through the elements of the water filter 1 as are illustrated, for example, in FIG. 9. The section runs through the driver 8 and the spring element 53 which is arranged therein and ensures that, in the state of the filter cartridge in which it is fitted into the filter head 2, the blend-adjusting element 49 is pressed spring-elastically against the end side of the filter cartridge in order thereby to permit satisfactory division of the untreated-water flow between the filter section 12 and the blending section 13.

A further advantageous embodiment is illustrated schematically in different perspective views in FIGS. 11 to 22. In this case, the adjusting device 60 for adjusting a partial-flow ratio between at least two flow paths 12, 13 is entirely arranged in the filter head 2. It again comprises an untreated-water distribution element 68 in the form of a diaphragm or a diaphragm ring, functionally corresponding to the blend-adjusting element 49 from the illustrations in FIGS. 4 to 10. In a departure from the embodiment illustrated in FIGS. 3 to 10, the partial-flow channel guiding element is no longer designed as part of the filter candle or filter cartridge 3, for example as correspondingly divided inlet regions for the main filter flow and the bypass filter flow, but rather, albeit functionally in a corresponding manner, in the form of a cap, likewise equipped with correspondingly arranged inlet openings 14, 15, but likewise arranged in the filter head 2. As a result, the adjustment of the blend ratio between the main filter flow 12 and the bypass filter flow 13 is completely independent of a filter cartridge 3 to be connected thereto. In order to be able to achieve a predominantly uniform distribution of the water supplied in each case to the main filter flow or bypass filter flow on the input side of a filter cartridge 3 to be connected thereto, partial flow distribution elements, for example in the form of channel 70, 71, can also be provided.

When the filter cartridge 3 is inserted into the filter head 2 (FIGS. 15, 17 and 21), said channels 70, 71 (FIG. 16) form equalizing elements in terms of the flow between the outlets of the rows of holes 74, 75 and the complementary inlets 14, 15 for the main filter flow or the bypass filter flow to the filter cartridge. By this means, substantially independently of the blend setting by the adjusting device 60 arranged in the head, a flow resistance which is as constant as possible is achieved for the flow through the filter cartridge, which can be attributed in particular to as uniform a distribution as possible of the respective partial flow to the inlet rows of inlet holes or passages 14, 15.

Figure 11:
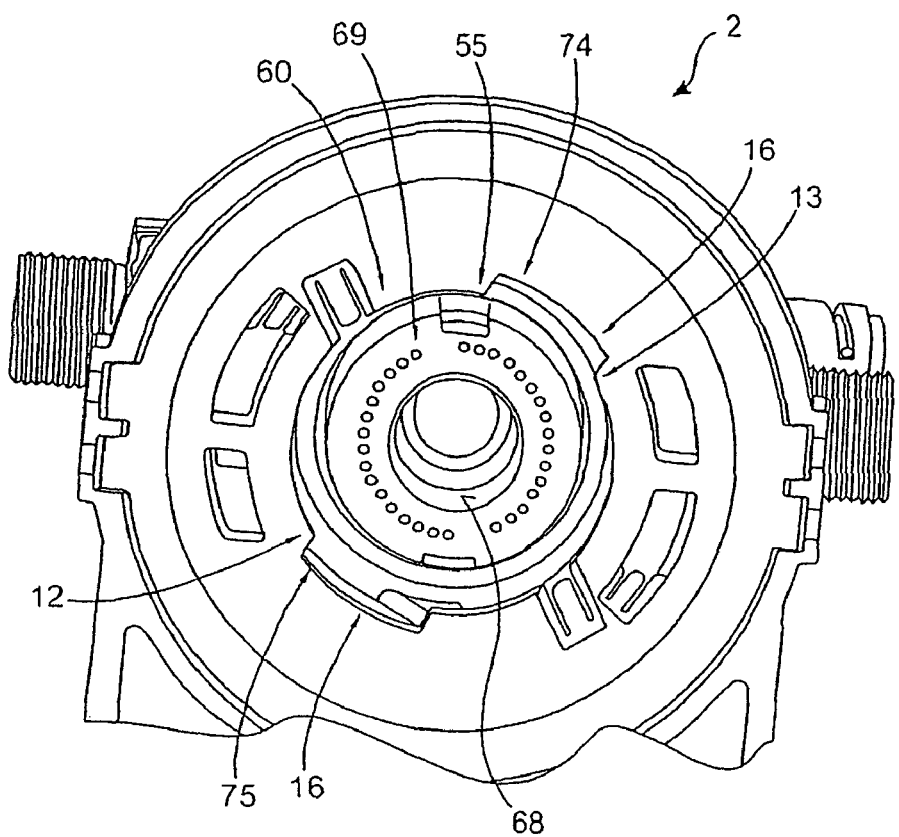

In FIG. 11, the filter head 2 in this regard is illustrated in a slightly oblique view, as seen from below. The adjusting device 60 for adjusting a partial-flow ratio between at least two flow paths 12, 13 which are supplied by two rows of passages 74, 75 arranged here substantially in each case in a semicircular manner is arranged centrally on the inside. By way of example, said passages 74, 75 are here each in the form of round holes and are formed in the partial-flow channel guiding cap 69.

In order additionally to be able to bring about a stabilizing effect on the liquid resistance, i.e. the internal resistance of the filter system, for a different blend setting, in a particularly preferred embodiment a cross-sectional adaptation of the individual passages to their position in the closure or opening curve can be provided for setting the blend ratio. For example, the cross section of adjacent passage holes 74, 75, as viewed in a direction of arrangement, can be designed such that they become continuously smaller from a maximum diameter to a minimum diameter beginning from an outer passage 74a or 75a as far as a final passage 74d or 75d (FIG. 16) and such that they become continuously larger the other way around.

Figure 16:
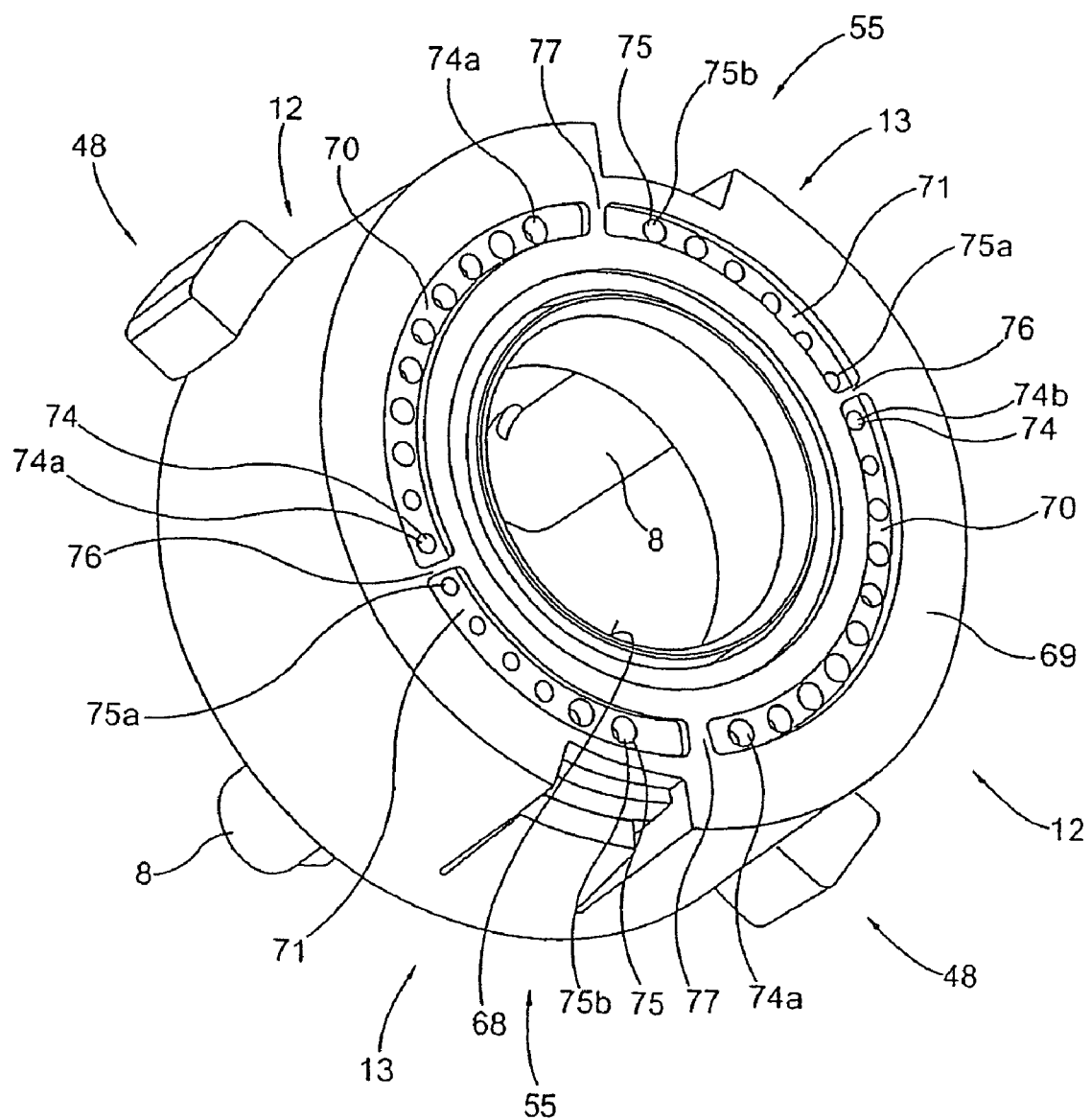

In the embodiment illustrated in FIG. 16, this mechanism is provided in duplicate in order to be able to make the supplying of the filter cartridge 2 with a correspondingly adjusted blend ratio independent of the supply thereof coincidentally from one of two possible use positions which are offset by 180°. It therefore does not matter in which orientation along the longitudinal axis the filter cartridge is inserted over the complementary bayonet closure elements between the filter cartridge 3 and the filter head 2. The water supply and the blend setting are ensured equally for both installation positions.

These cross-sectional changes are designed in an opposed manner with respect to the direction of adjustment of the two rows of holes 74, 75. By this means, during a blend setting with a small bypass portion, a comparatively high flow resistance is opposed by a comparatively low, effective throughflow cross section. As the blend portion increases, the cross section of the particularly individual passage 75 likewise become increasingly larger. The geometries of the respective throughflow holes are dependent on the sum of the flow resistance conditions, which is effective for the particular blend setting, in the entire filter system. In a different construction of the head or a different construction of the filter cartridge, entirely different geometrical designs for the passages 74, 75 may therefore be more advantageous or supply better flow ratios for an internal resistance of the filter system, which internal resistance remains substantially constant over the entire blend-adjusting region.

The distribution of the flow portion, which is controlled by the blend setting, for the main filter flow and for the bypass flow 13 takes place via the respective channel 70 or 71 via which the complementary entry holes 14, 15 of the filter cartridge 3 are substantially supplied uniformly in such a manner that the setting of the blend ratio can only have a small, if any, effect on the flow ratios in the interior of the filter cartridge.

A further part of the associated untreated-water distribution element 68 together with the two drivers 8 assigned thereto is illustrated in the central passage opening of the cap-shaped partial-flow channel guiding element 69 for receiving the filter cartridge neck. In the assembled state, said untreated-water distribution element 68 is arranged, corresponding to the illustration in FIGS. 11 and 12, preferably joined together in a sealed manner, within the partial-flow channel guiding element 69 in the interior of the head 2. By providing a seal between the untreated-water distribution element 68 and the partial-flow channel guiding element 69, it can be ensured that water can flow into the filter cartridge 3 only through the passages 74 and 75 opened up by the diaphragm 68.

Figure 12:
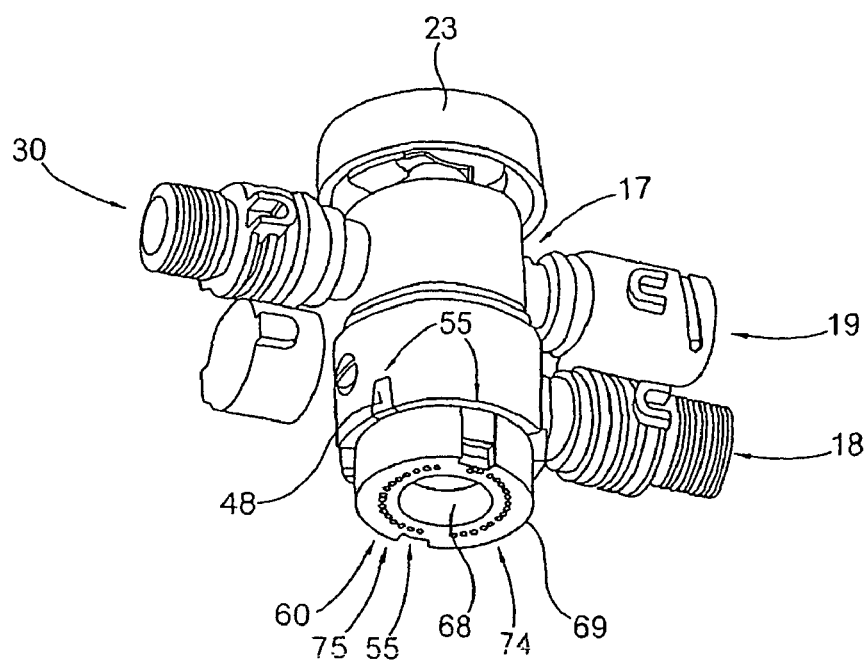
Figure 13:
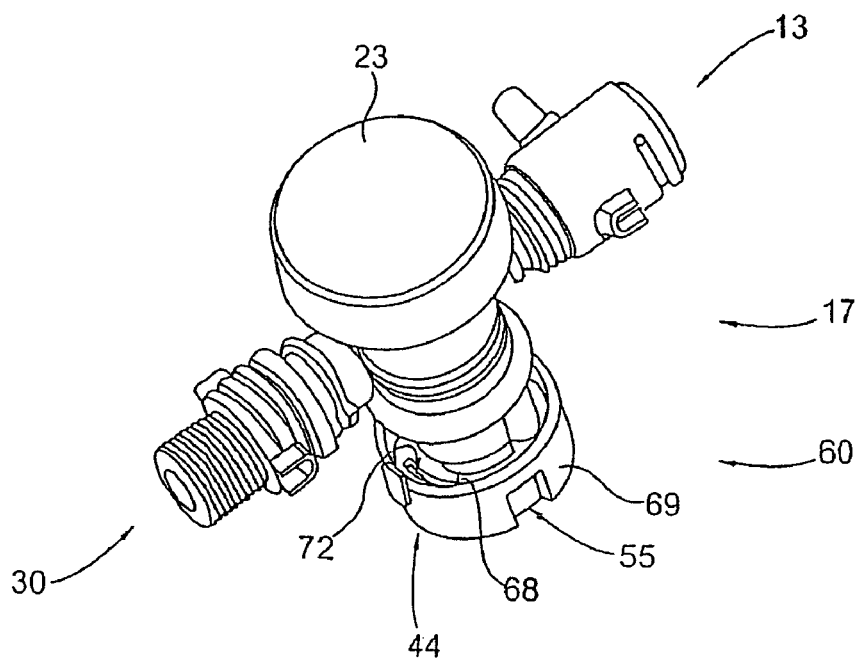

FIG. 12 shows a schematic, perspective view of parts of the filter head 2 without its housing. An essential feature of the embodiment described here is the adjusting device 60, which is illustrated in the lower region of the figure, for adjusting a partial-flow ratio between the at least two flow paths or treatment sections 12, 13, said adjusting device comprising the above-described untreated-water distribution element 68 and the partial-flow channel guiding element 69. The connection of the adjusting device 60 to the blend-adjusting sleeve can take place, for example, by a clip connection between the partial-flow channel guiding element 69 and the untreated-water distribution element 68 and by positioning the partial-flow channel guiding element 69 as in the previously described embodiment, for example via a cam-like engagement, here, for example, by means of a key element, which is assigned to the partial-flow channel guiding element 69 and is in the form of a cam, and a complementary recess assigned to the valve body 49.

The remaining components substantially correspond to the components already described above for the other embodiments, at least insofar as they have the same reference numbers.

FIG. 13 shows again, schematically in a perspective view, an arrangement of components from the filter head 2, in this case as seen from above. The two essential elements, the untreated-water distribution element 68 and the partial-flow channel guiding element 69 of the adjusting device 60, can be partially seen here from the rear side, i.e. basically from the interior of the filter head. One of the two slot-shaped openings 72 which form a passage element 72 of the diaphragm 68 can be partially seen in the left-low region of this illustration. Said diaphragm opens up the passage holes 74 and 75, which can readily be seen in FIGS. 11 and 16, if it comes to overlap therewith.

Figure 14:
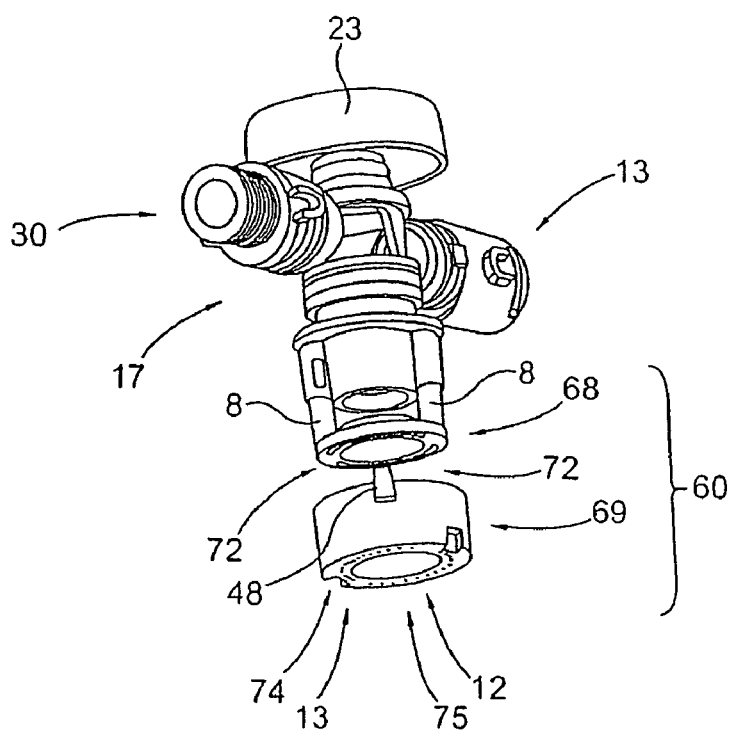
Figure 15:
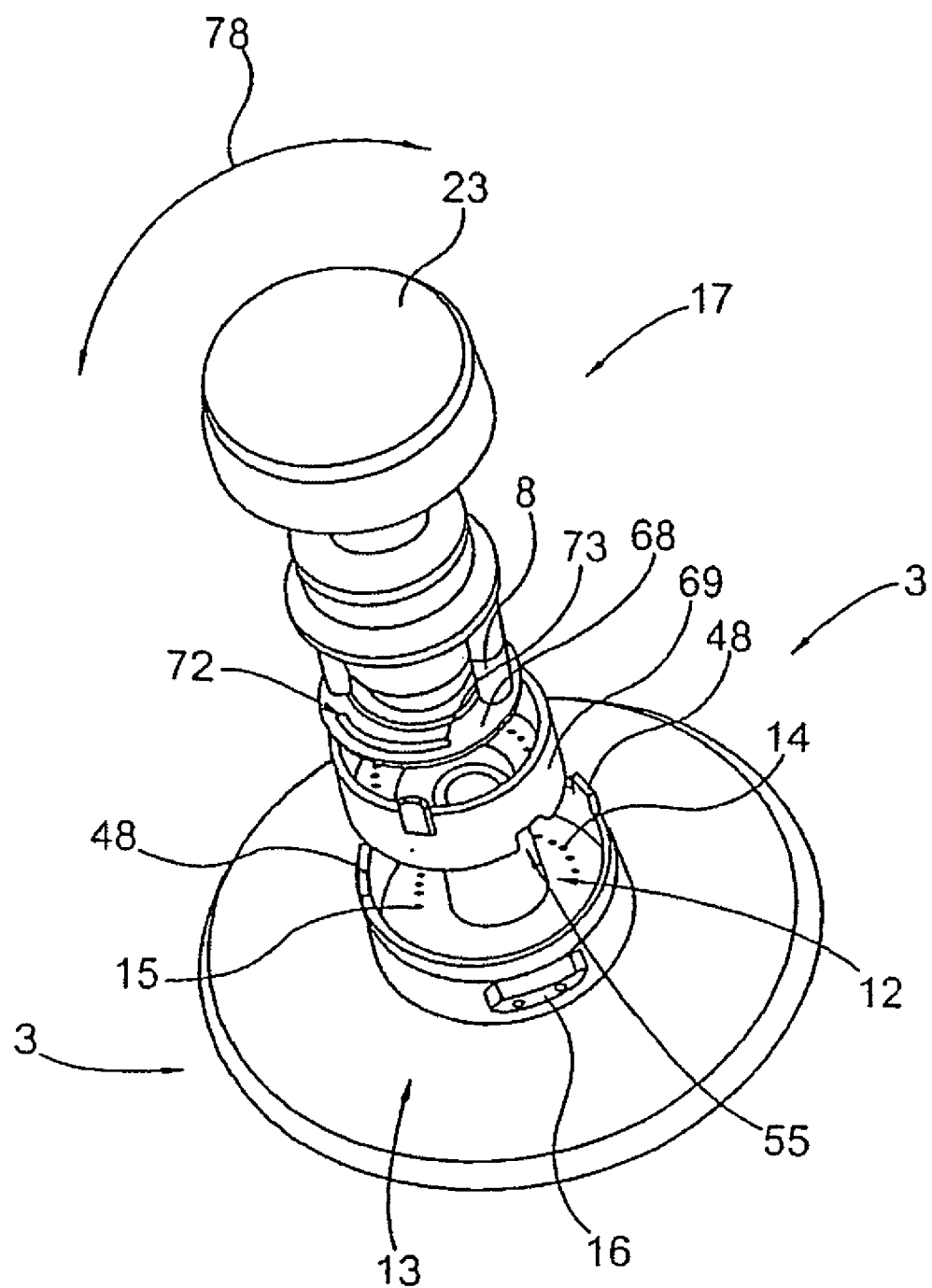

In the illustration of FIG. 14, the untreated-water distribution element 68 and the partial-flow channel guiding element 69 are illustrated in exploded form along a common longitudinal axis. The two slot-shaped openings 72 for forming a passage element for supplying the two rows of passages 74, 75 can also be seen at least partially therein. An exploded illustration of said elements is shown together with the neck of the filter cartridge 3 in FIG. 15. One of the two slot-shaped openings 72 of the untreated-water distribution element 68 in the form of a diaphragm can also be seen better therein. Furthermore, one of two essential further elements of said diagram 68 in the form of the covering which closes the opening 74 and 75 rather than the slot-shaped openings 72 can be seen here. Depending on the rotation of the cap 23 in the one or other direction of the double arrow 78, the slot-shaped opening 72 opens up a certain number of passage openings 74, 75 or the covering 73 covers them in order to adjust the blend ratio between the main filtrate flow and the bypass filter flow. These two partial flows can subsequently enter, as seen in the direction of flow, into the filter cartridge 3 through the respective rows of holes 14 and 15.

Figure 17:
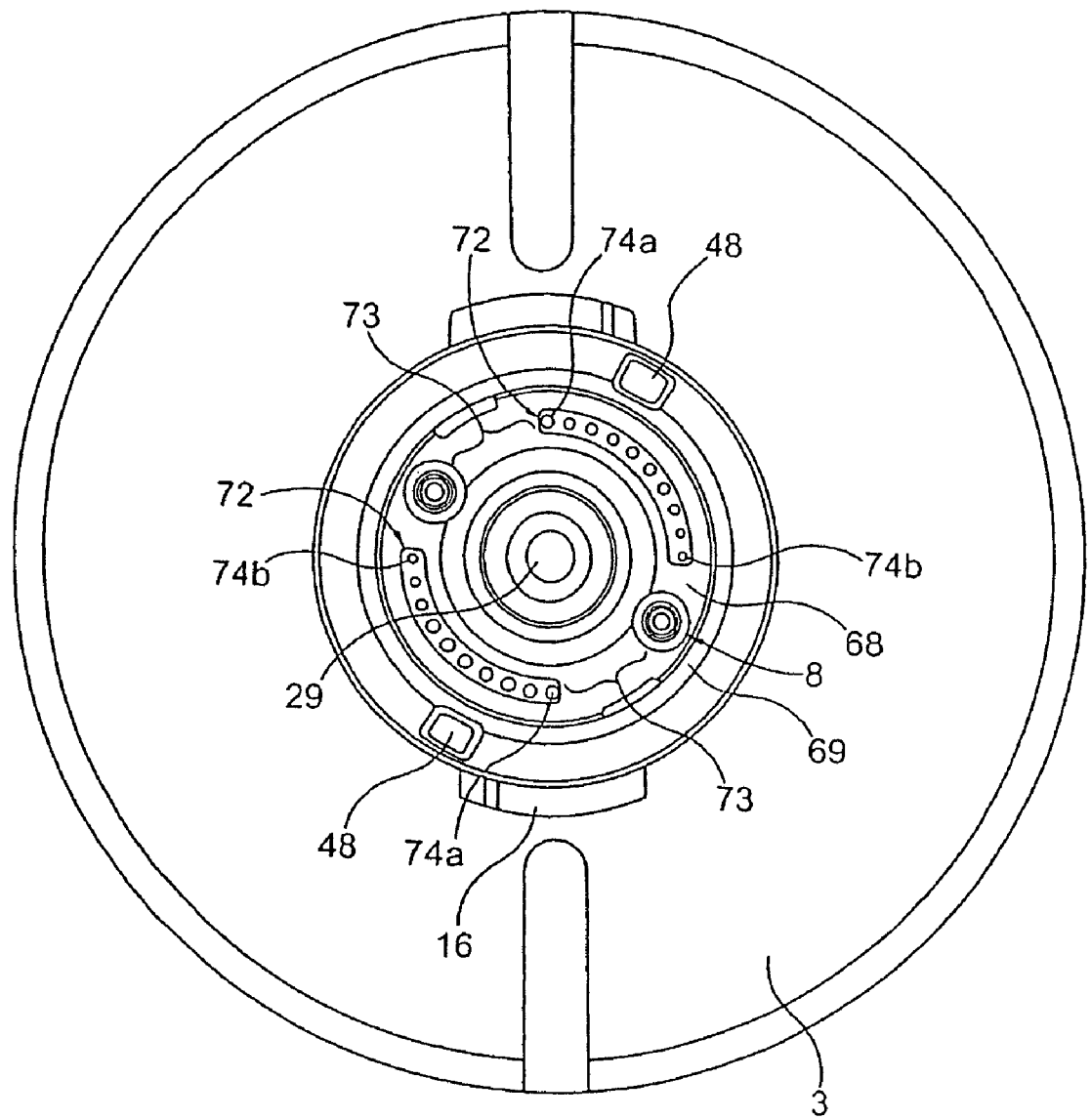

Since FIG. 16 has already been described in detail above, reference is now made to FIG. 17. The latter shows a top view of the connection of the filter cartridge 3, in which the filter output 29 is illustrated centrally. Around the latter are arranged the partial-flow channel guiding element 69 with the two rows of passage holes 74a to 74b for activating the main filter flow and, thereabove, the untreated-water distribution element 68 with the slot-shaped openings 72, likewise formed in duplicate, and with the two complementary covering elements 73 for closing the passage openings 75, which are located therebelow, for example, for the bypass section of the filter 3.

The two drivers 8 on the left and right of the filter output 29 are also illustrated as the drivers for adjusting the untreated-water distribution element 68 and therefore for adjusting the blend ratio between the main filter flow and bypass flow.

Figure 18:
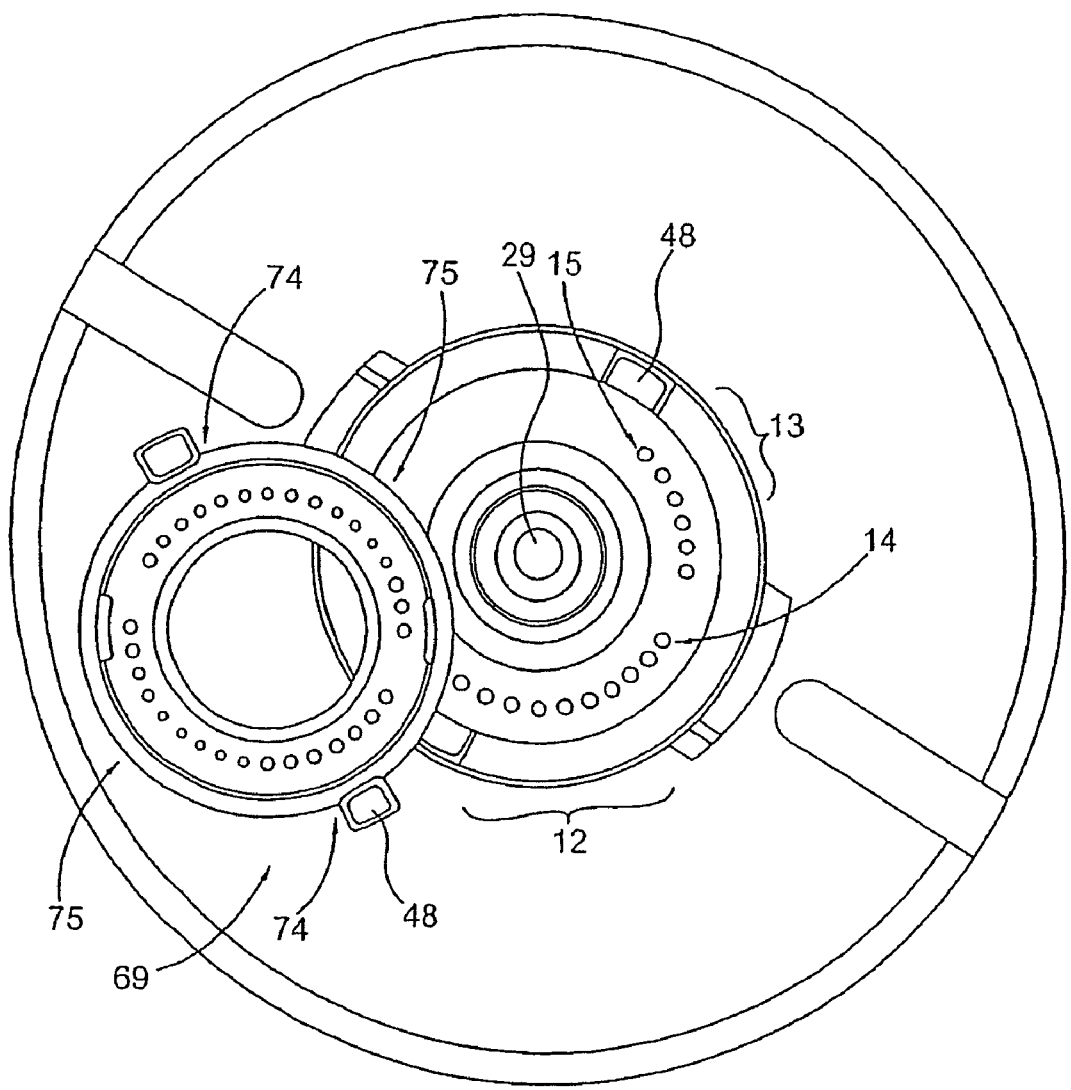

FIG. 18 schematically illustrates a top view of the connection of a filter 3, in which a partial-flow channel guiding element 69 is shown obliquely thereabove. The two rows of holes 14, 15 for the main filter flow and the bypass flow are illustrated on the filter connection on a semicircular side around the filter output 29. Said rows of holes all have the same diameter, shown here by way of example. However, owing to the channel guidance on that side of the partial-flow channel guiding element 69 which faces the filter cartridge 3, they have no effect on the adjustment of the blend ratio between the main filter flow and bypass flow.

In the partial-flow channel guiding element 69, the rows of holes 74, 75 for the two positions, which are rotatable through 180°, for the insertion of the filter cartridge 3 into the filter head 2, as already described in detail above, are again illustrated.

Figure 19:
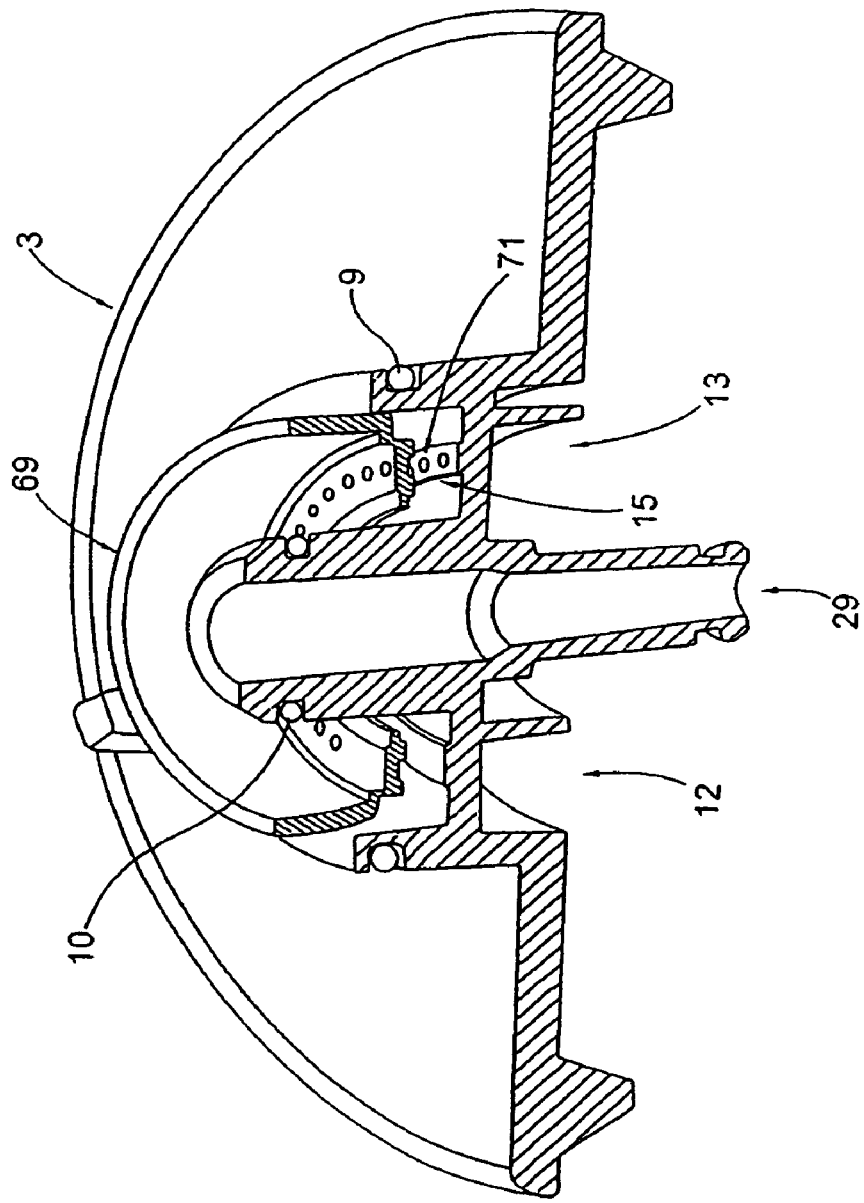

FIG. 19 shows perspectively a sectional view of the connecting region of the filter cartridge 3. Arranged at a distance thereabove is a further part of a partial-flow channel guiding element 69, which part is likewise depicted in a sectional illustration. This is intended to show the effect of the channel 70 for the main filter flow and of the channel 71 for the bypass flow for the distribution between the corresponding outlet from the partial-flow channel guiding element 69 and the inlet into the relevant filter or treatment section 12 or 13.

Figure 20:
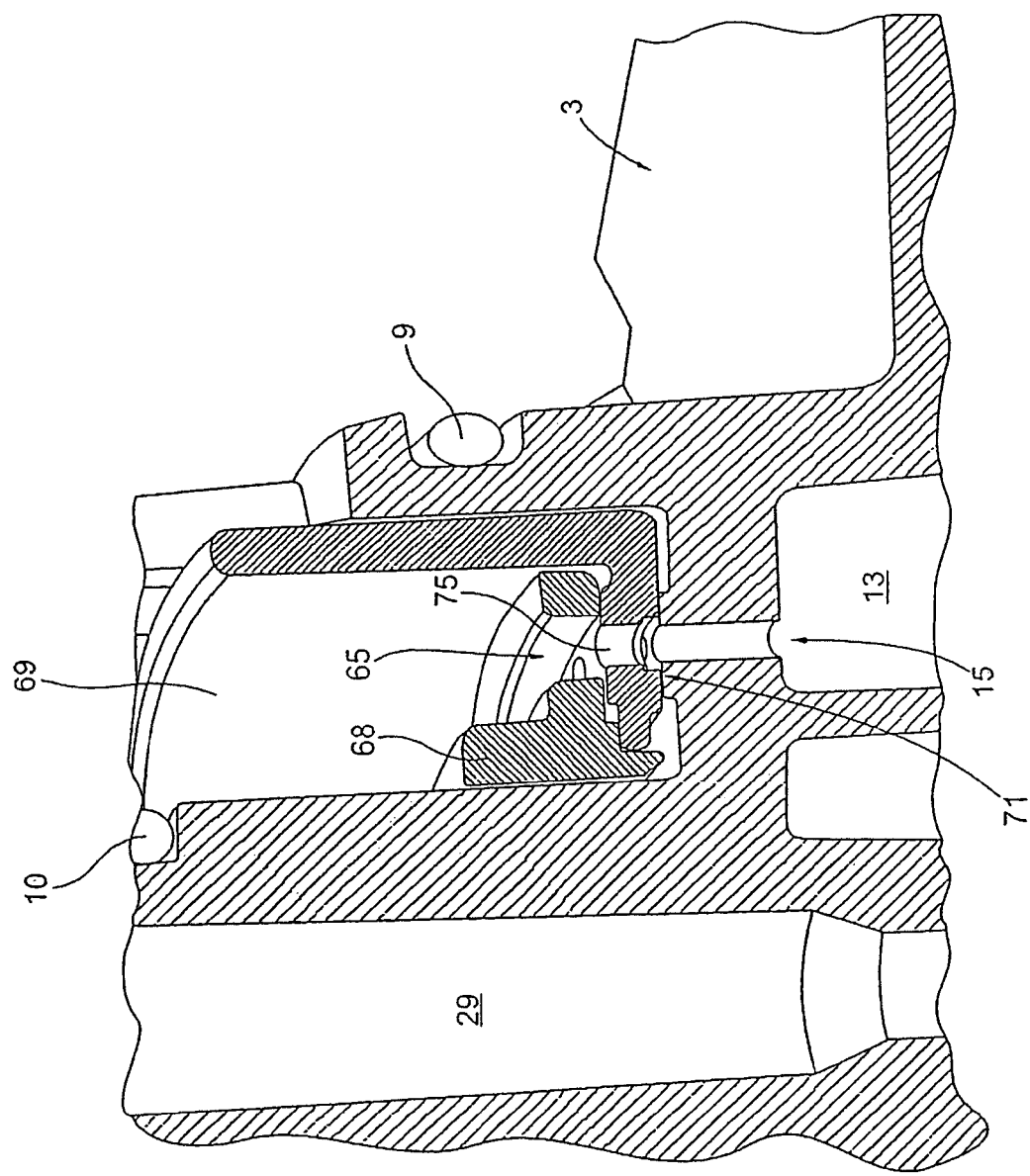

FIG. 20 illustrates an enlarged illustration through a further section through the filter cartridge connection, in which a detail of the partial-flow channel guiding element 69 and part of the untreated-water distribution element 68 are shown on an enlarged scale for the purpose of better illustration.

Figure 21:
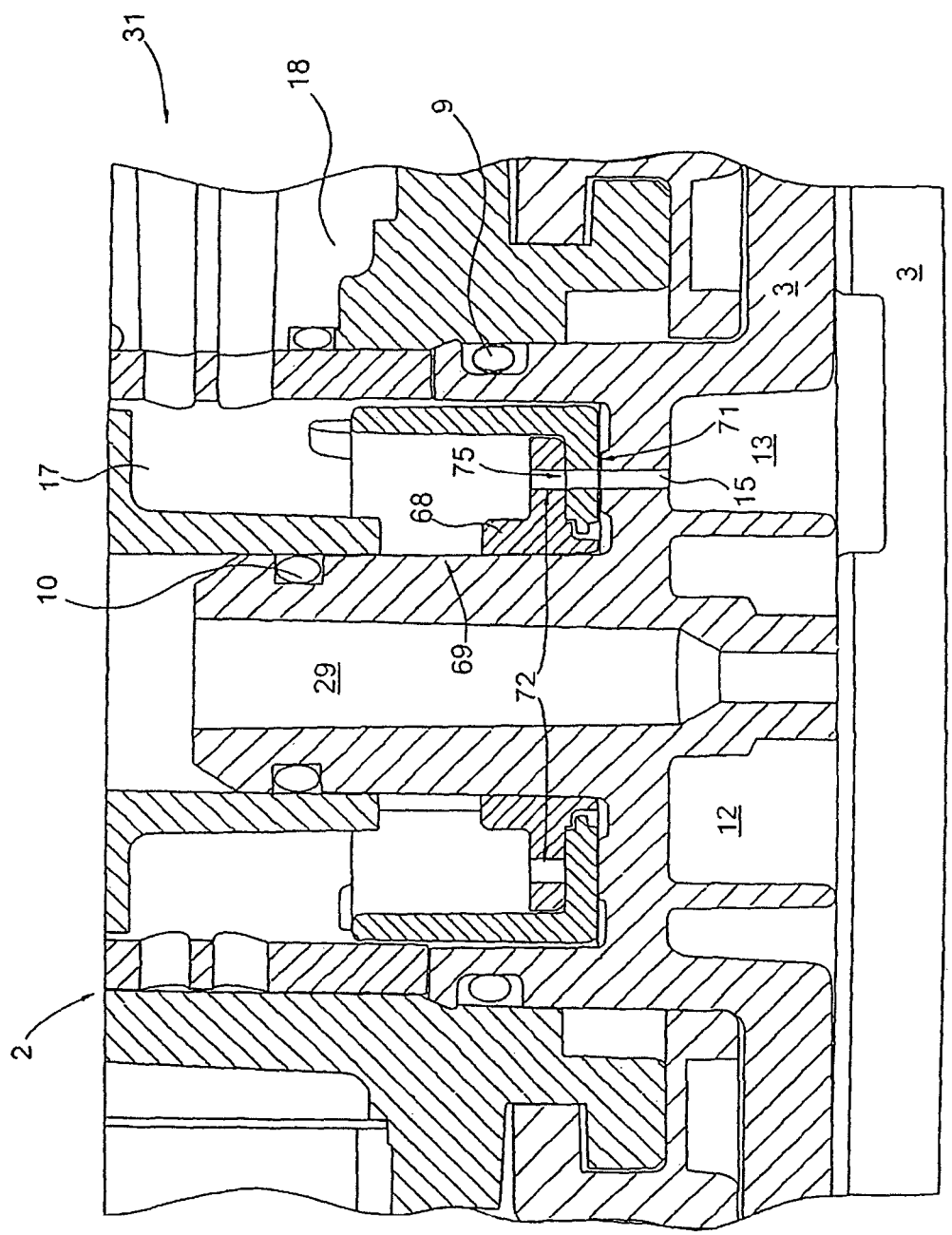
Figure 22:
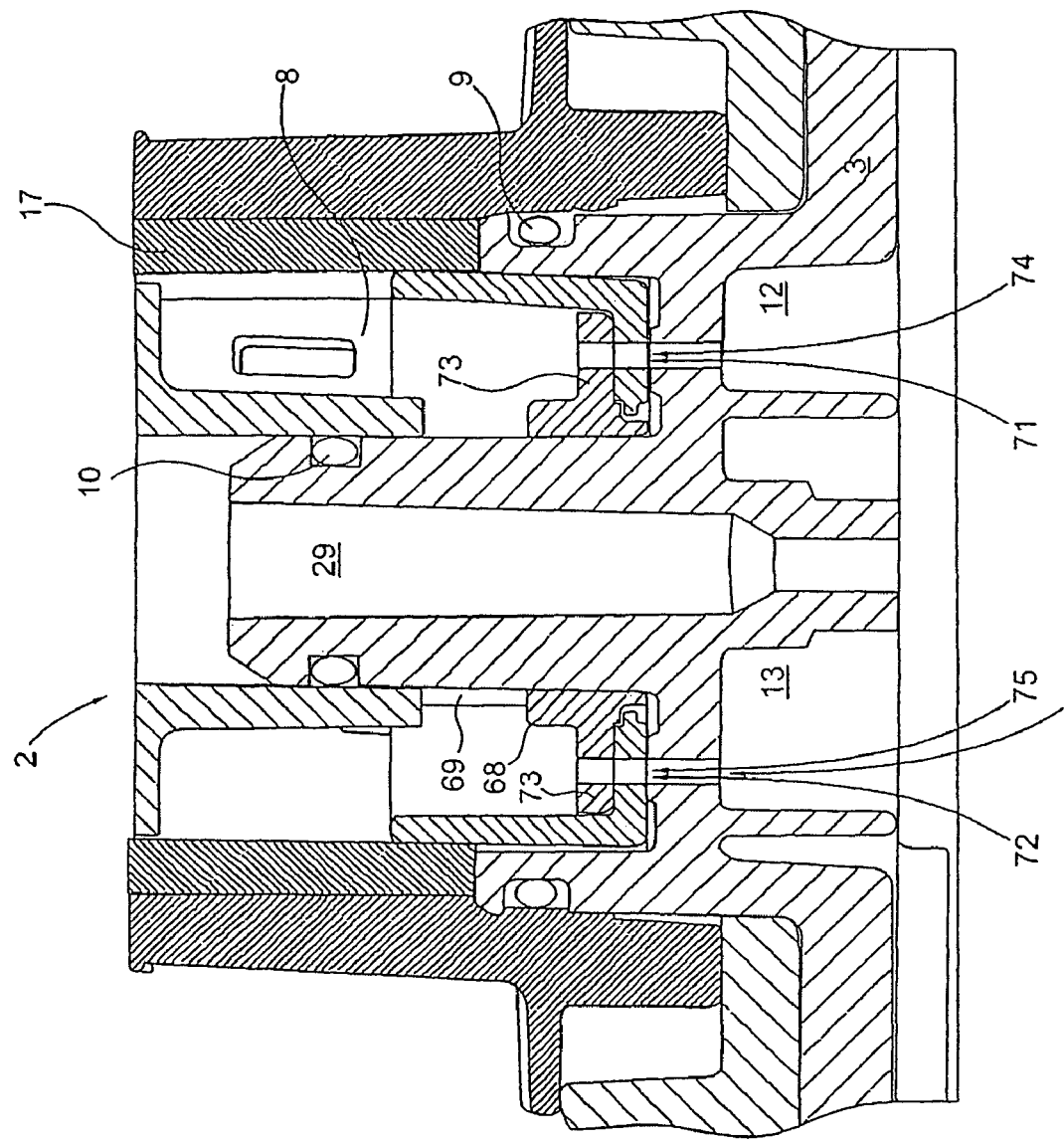

FIGS. 21 and 22 show schematically two further sectional illustrations, in which the upper part of the filter cartridge 3 is arranged in the filter head 2 and the blend setting between the main filter flow and bypass flow is controlled by the adjusting device 60. In the illustration of FIG. 21, a passage for the bypass flow is shown in the right half of the image, corresponding to the illustration in FIG. 20. The left half of the image illustrates the main filter flow section or treatment section 12, but no passage opening 15 is formed therein in this sectional plane. However, both for the main filter flow 12 and for the bypass flow or treatment section 13, at least parts of the passage are opened up by the opening 72 located thereabove. By contrast, in FIG. 22, the section through a filter head arrangement of this type is placed in such a manner that, for both partial-flow sections, the main filter flow and bypass filter flow, a respective closure by means of the covering element 73 is shown.

LIST OF REFERENCE NUMBERS

1 Water filter
2 Filter head
3 Filter cartridge
4 Housing
5 Bore
6 Bore
7 Blend-adjusting ring/untreated-water distribution element (filter cartridge)
8 Driver
9 Seal
10 Seal
11 Untreated-water feed
12 Treatment section
13 Treatment section
14 Passage or holes
15 Passage or holes
16 Bayonet
17 Blend-adjusting sleeve
18 Valve
19 Valve
20 Cam
21 Valve tappet
22 Driver
23 Cap
24 Latching position
25 Seal
26 Screw
27 Opening
28 Opening
29 Filter output
30 Outlet
31 Inlet
32 Opening
33 Opening
34 Stop
35 Outer wall
36 Adjustment position
37 Adjustment position 38 Sleeve
39 Sleeve
40 Sleeve
41 Threaded connection
42 Extension
43 Arrow
44a-h Opening/passage element
45 Outlet valve
46 Tappet
47 Cam
48 Key element
49 Blend-adjusting element/untreated-water distribution element (filter head)
50 Passage
51 Covering
52 Fixing element
53 Spring element
54 Release and flushing outlet
55 Encryption element
56 Valve body
57 Opening
58 Opening
59 Blending device
60 Adjusting device
61 Untreated-water distribution sleeve/untreated-water distribution element (filter cartridge)
62 Passage
63 Passage
64 Partial-flow channel guiding element
65 Opening/passage element
66 Covering element
67 Resetting element
68 Untreated-water distribution element/diaphragm (filter head)
69 Partial-flow channel guiding element/cap (filter head)
70 Channel
71 Channel
72 Opening/passage element
73 Covering/passage element
74 Passage
74a Passage
74b Passage
75 Passage
75a Passage
75b Passage
76 Web
77 Web
78 Arrow
79 Cam/extension

What is claimed is:

1. In a water filter having a filter head, an interchangeable filter cartridge, a blending device and an adjusting device for adjusting a partial-flow ratio between at least two flow paths, wherein at least one flow path is a filter section, wherein the improvement comprises an adjusting device having an untreated-water distribution element arranged in or on the filter head and a partial-flow channel guiding element complementary with respect thereto arranged in or on the filter cartridge and joined together and/or positioned to correlate the untreated-water distribution element to the partial flow-guiding element when the filter cartridge is fitted into the filter head.

2. The water filter as claimed in claim 1, wherein the untreated-water distribution element (7, 49, 61, 68) is adjustable radially in relation to the partial-flow channel guiding element (64, 69).

3. The water filter as claimed in claim 1 wherein the untreated-water distribution element (7, 49, 61, 69) is adjustable axially in relation to the partial-flow channel guiding element (64, 69).

4. The water filter as claimed in claim 1 or 2 wherein the untreated-water distribution element (49, 68) is a part of the filter head (2).

5. The water filter as claimed in claim 1 or 2 wherein the untreated-water distribution element (49, 68) is a separate element which can be inserted into the filter head (2).

6. The water filter as claimed in claim 1 or 2 wherein an unreleasable connection is provided between the untreated-water distribution element (49, 68) and the filter head (2).

7. The water filter as claimed in claim 1 or 2 wherein a releasable connection is provided between the untreated-water distribution element (49, 68) and the filter head (2).

8. The water filter as claimed in claim 1 or 2 wherein the untreated-water distribution element (49, 68) is an interchangeable element.

9. The water filter as claimed in claim 1 or 2 further comprising a control element (47, 79) for an equipment-dependent positioning of an inlet valve (18) and/or of an outlet valve (45).

10. The water filter as claimed in claim 1 further comprising a control element (23) for the untreated-water distribution element.

11. The water filter as claimed in claim 1 or 10 wherein a positioning unit (17, 23) for the untreated-water distribution element (49, 68) is in the filter head (2).

12. The water filter as claimed in claim 1 or 10 wherein the untreated-water distribution element (7, 49, 61, 68) has at least one passage element (32, 33, 44*a-h*, 50, 65, 72) and/or a covering element (51, 66, 73).

13. The water filter as claimed in claim 1 or 10 wherein the untreated-water distribution element (7, 68) is in the form of a ring or disk.

14. The water filter as claimed in claim 1 or 10 wherein the untreated-water distribution element (61, 68) is in the form of a sleeve.

15. The water filter as claimed in claim 1 or 10 wherein the partial-flow channel guiding element (64, 69) has at least one filter section inlet (12) and at least one blending section inlet (13) or filter section inlet or water treatment section inlet.

16. The water filter as claimed in claim 1 or 10 wherein the overall cross section of the partial-flow channel guiding element (64, 69) is effectively opened up by the untreated-water distribution element (7, 49, 61, 68) and is formed from the sum of the two partial flows (12, 13) and is substantially identical in size in all of the blend settings.

17. The water filter as claimed in claim 1 or 10 wherein the overall cross section of the partial-flow channel guiding element (64, 69) is effectively opened up by the untreated-water distribution element (7, 49, 61, 69) and is formed from the sum of the two partial flows (12, 13) and differs in size at different blend settings.

18. The water filter as claimed in claim 1 or 10 wherein an encryption is formed between an element (48) assigned to the filter head (2) and an element (55) assigned to the filter cartridge (3).

19. The water filter as claimed in claim 1 wherein a predominantly consistent internal pressure ratio and a blend ratio is independent of the throughflow volume.

20. An untreated water distribution device comprising:
    (a) a housing having a first partial flow path and a second partial flow path;
    (b) a covering for increasing or decreasing an effective throughflow cross section for said first partial flow path while simultaneously increasing or decreasing the effective throughflow cross section for said second partial flow by increasing or decreasing said first partial flow path by an amount equal to but opposite to an increase or a decrease of said second partial flow path to maintain a substantially constant internal pressure ratio and a blend ratio which is independent of throughflow volume in said housing;
(c) an adjusting device for activating said covering; and
(d) an adjustable driver or fixed driver for operating said adjusting device and positioning said housing in or on a filter head.

21. The untreated water distribution device of claim 20 wherein said adjustable driver automatically adopts a previously set blend ratio.

22. A water filter apparatus comprising:
(a) a filter head;
(b) an interchangeable filter cartridge;
(c) a blending device providing a first partial flow path to said interchangeable filter cartridge and a second partial flow path to bypass the first partial flow path in said interchangeable filter cartridge;
(d) an adjustable driver or a fixed driver for operating an adjustable device; and
(e) an adjusting device for increasing said first partial flow path to said interchangeable filter cartridge while substantially simultaneously decreasing said second partial flow path to bypass said first partial flow path in said interchangeable filter cartridge or decreasing said first partial flow path to said interchangeable filter cartridge while substantially increasing said second partial flow to bypass said first partial flow path in said interchangeable filter cartridge, said adjusting device selected from a group of adjusting devices consisting of:
a ring with at least one passage or blocking element; or
at least one concentric sleeve with at least one passage or blocking element; or
a combination thereof.

23. The untreated water distribution device of claim 20 wherein the covering includes an untreated water distribution element.

24. The untreated water distribution device of claim 23 wherein the housing is a filter cartridge housing.

25. The untreated water distribution device of claim 20 further comprising an untreated water distribution element disposed in a second housing.

26. The untreated water distribution device of claim 25 wherein said housing is a filter cartridge housing and said second housing is a filter head.

27. The untreated water distribution device of claim 20 wherein the covering includes an untreated water distribution element and said housing is a filter cartridge.

28. The untreated water distribution device of claim 20 wherein said covering includes an untreated water distribution element and said housing is a filter head.

* * * * *